United States Patent
Wheeler et al.

(10) Patent No.: US 6,938,156 B2
(45) Date of Patent: *Aug. 30, 2005

(54) ABDS SYSTEM AND VERIFICATION STATUS FOR AUTHENTICATING ENTITY ACCESS

(75) Inventors: Henry Lynn Wheeler, Greenwood Village, CO (US); Anne M. Wheeler, Greenwood Village, CO (US)

(73) Assignee: First Data Corporation, Greenwood Village, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 10/248,605

(22) Filed: Jan. 31, 2003

(65) Prior Publication Data

US 2003/0126438 A1 Jul. 3, 2003

Related U.S. Application Data

(63) Continuation of application No. PCT/US01/24567, filed on Aug. 6, 2001.
(60) Provisional application No. 60/223,076, filed on Aug. 4, 2000.

(51) Int. Cl.$^7$ ................................................. H04L 9/00
(52) U.S. Cl. ..................... 713/170; 713/176; 713/182; 713/183; 713/186; 713/202; 380/282; 705/67
(58) Field of Search ............................. 713/168, 170, 713/172, 176, 182, 183, 186, 202, 155, 16, 200; 380/282, 285; 705/53, 54, 57, 58, 74

(56) References Cited

U.S. PATENT DOCUMENTS 3,962,539 A   6/1976  Ehrsam et al.
4,200,770 A   4/1980  Hellman et al.
4,218,582 A   8/1980  Hellman et al.
4,405,829 A   9/1983  Rivest et al.

(Continued)

FOREIGN PATENT DOCUMENTS

CA          2271178        5/1999

OTHER PUBLICATIONS

U.S. Appl. No. 60/223,076.*
PKCS #9, Selected Object Classes and Attribute Types Version 2.0, RSA Laboratories, Redwood City, CA, pp 1–42.
Digital Signature Guidelines Tutorial; ABA Network, (web site at http://www.abanet.org/scietech/ec/isc/dsg–tutorial.html), date of capture Feb. 18, 2003, pp 1–7, Feb. 18, 2003.

(Continued)

Primary Examiner—Gilberto Barron
Assistant Examiner—Kambiz Zand
(74) Attorney, Agent, or Firm—Morris, Manning & Martin

(57) ABSTRACT

A system in which a requesting entity seeking access to a controlled resource is authenticated by an access authentication component includes the requesting entity initially opening a security account with the access authentication component, the access authentication component establishing and maintaining a record including information pertaining to the account and being retrievable based on a unique identifier for the requesting entity, and associating a public key of a public-private key pair with record; the requesting entity originating an electronic message and generating a digital signature using a provide key of the key pair, and sending the digitally signed electronic message to the access authentication component with the unique identifier; authenticating the electronic message using the public key associated with the record identified by the unique identifier; and upon successful authentication, authenticating access to the controlled resource. A digitally signed verification status is included with the electronic message.

40 Claims, 24 Drawing Sheets

U.S. PATENT DOCUMENTS

| | | | |
|---|---|---|---|
| 4,408,203 A | | 10/1983 | Campbell |
| 4,424,414 A | | 1/1984 | Hellman et al. |
| 4,734,564 A | | 3/1988 | Boston et al. |
| 4,748,668 A | | 5/1988 | Shamir et al. |
| 4,797,920 A | | 1/1989 | Stein |
| 4,823,388 A | | 4/1989 | Mizutani et al. |
| 4,825,050 A | | 4/1989 | Griffith et al. |
| 4,850,017 A | | 7/1989 | Matyas, Jr. et al. |
| 4,868,877 A | | 9/1989 | Fischer |
| 4,885,788 A | | 12/1989 | Takaragi et al. |
| 5,018,196 A | | 5/1991 | Takaragi et al. |
| 5,029,208 A | * | 7/1991 | Tanaka ...................... 380/279 |
| 5,097,504 A | | 3/1992 | Camion et al. |
| 5,140,634 A | | 8/1992 | Guillou et al. |
| 5,214,703 A | | 5/1993 | Massey et al. |
| 5,225,978 A | | 7/1993 | Petersen et al. |
| 5,231,668 A | | 7/1993 | Kravitz |
| 5,422,953 A | | 6/1995 | Fischer |
| 5,453,601 A | | 9/1995 | Rosen |
| 5,455,865 A | | 10/1995 | Perlman |
| 5,502,766 A | * | 3/1996 | Boebert et al. ............. 713/193 |
| 5,509,071 A | | 4/1996 | Petrie, Jr. et al. |
| 5,534,855 A | | 7/1996 | Shockley et al. |
| 5,539,828 A | | 7/1996 | Davis |
| 5,557,518 A | | 9/1996 | Rosen |
| 5,563,946 A | | 10/1996 | Cooper et al. |
| 5,577,120 A | | 11/1996 | Penzias |
| 5,586,036 A | | 12/1996 | Pintsov |
| 5,590,197 A | | 12/1996 | Chen et al. |
| 5,604,801 A | | 2/1997 | Dolan et al. |
| 5,606,609 A | | 2/1997 | Houser et al. |
| 5,615,266 A | | 3/1997 | Altschuler et al. |
| 5,619,574 A | | 4/1997 | Johnson et al. |
| 5,623,637 A | | 4/1997 | Jones et al. |
| 5,625,690 A | | 4/1997 | Michel et al. |
| 5,636,280 A | | 6/1997 | Kelly |
| 5,659,616 A | | 8/1997 | Sudia |
| 5,671,279 A | | 9/1997 | Elgamal |
| 5,671,285 A | | 9/1997 | Newman |
| 5,677,953 A | | 10/1997 | Dolphin |
| 5,677,955 A | | 10/1997 | Doggett et al. |
| 5,694,471 A | | 12/1997 | Chen et al. |
| 5,708,780 A | | 1/1998 | Levergood et al. |
| 5,715,314 A | | 2/1998 | Payne et al. |
| 5,721,779 A | | 2/1998 | Funk |
| 5,724,424 A | | 3/1998 | Gifford |
| 5,745,886 A | | 4/1998 | Rosen |
| 5,751,813 A | | 5/1998 | Dorenbos |
| 5,778,072 A | | 7/1998 | Samar |
| 5,781,723 A | | 7/1998 | Yee et al. |
| 5,787,172 A | | 7/1998 | Arnold |
| 5,790,677 A | | 8/1998 | Fox et al. |
| 5,796,840 A | | 8/1998 | Davis |
| 5,809,144 A | | 9/1998 | Sirbu et al. |
| 5,812,666 A | | 9/1998 | Baker et al. |
| 5,825,884 A | | 10/1998 | Zdepski et al. |
| 5,848,161 A | | 12/1998 | Luneau et al. |
| 5,862,327 A | | 1/1999 | Kwang et al. |
| 5,870,475 A | | 2/1999 | Allan et al. |
| 5,878,142 A | | 3/1999 | Caputo et al. |
| 5,883,810 A | | 3/1999 | Franklin et al. |
| 5,887,131 A | | 3/1999 | Angelo |
| 5,903,882 A | | 5/1999 | Asay et al. |
| 5,910,988 A | | 6/1999 | Ballard |
| 5,910,989 A | | 6/1999 | Naccache |
| 5,943,423 A | | 8/1999 | Muftic |
| 5,949,881 A | | 9/1999 | Davis |
| 5,956,404 A | | 9/1999 | Schneier et al. |
| 5,963,648 A | | 10/1999 | Rosen |
| 5,970,147 A | | 10/1999 | Davis |
| 6,000,522 A | | 12/1999 | Johnson |
| 6,000,832 A | | 12/1999 | Franklin et al. |
| 6,009,177 A | | 12/1999 | Sudia |
| 6,021,202 A | | 2/2000 | Anderson et al. |
| 6,023,509 A | | 2/2000 | Herbert et al. |
| 6,029,150 A | | 2/2000 | Kravitz |
| 6,044,154 A | | 3/2000 | Kelly |
| 6,047,051 A | | 4/2000 | Ginzboorg et al. |
| 6,061,794 A | * | 5/2000 | Angelo et al. .............. 713/200 |
| 6,061,799 A | * | 5/2000 | Eldridge et al. ............ 713/202 |
| 6,070,154 A | | 5/2000 | Tavor et al. |
| 6,084,969 A | | 7/2000 | Wright et al. |
| 6,092,202 A | | 7/2000 | Veil et al. |
| 6,102,287 A | | 8/2000 | Matyas, Jr. |
| 6,104,815 A | | 8/2000 | Alcorn et al. |
| 6,105,012 A | | 8/2000 | Chang et al. |
| 6,108,644 A | | 8/2000 | Goldschlag et al. |
| 6,111,956 A | | 8/2000 | Field et al. |
| 6,134,325 A | | 10/2000 | Vanstone et al. |
| 6,144,949 A | | 11/2000 | Harris |
| 6,154,543 A | | 11/2000 | Baltzley |
| 6,161,180 A | | 12/2000 | Matyas et al. |
| 6,161,181 A | | 12/2000 | Haynes et al. |
| 6,167,518 A | | 12/2000 | Padgett et al. |
| 6,189,096 B1 | | 2/2001 | Haverty |
| 6,192,130 B1 | | 2/2001 | Otway |
| 6,192,405 B1 | * | 2/2001 | Bunnell ...................... 709/225 |
| 6,199,052 B1 | | 3/2001 | Mitty et al. |
| 6,202,151 B1 | | 3/2001 | Musgrave et al. |
| 6,205,437 B1 | | 3/2001 | Gifford |
| 6,213,391 B1 | * | 4/2001 | Lewis ........................ 235/380 |
| 6,230,269 B1 | | 5/2001 | Spies et al. |
| 6,233,565 B1 | | 5/2001 | Lewis et al. |
| 6,240,091 B1 | | 5/2001 | Ginzboorg et al. |
| 6,243,812 B1 | | 6/2001 | Matyas et al. |
| 6,253,027 B1 | | 6/2001 | Weber et al. |
| 6,263,447 B1 | | 7/2001 | French et al. |
| 6,279,112 B1 | * | 8/2001 | O'Toole et al. ............. 713/201 |
| 6,282,522 B1 | | 8/2001 | Davis et al. |
| 6,285,991 B1 | | 9/2001 | Powar |
| 6,299,062 B1 | | 10/2001 | Hwang |
| 6,314,519 B1 | | 11/2001 | Davis et al. |
| 6,324,525 B1 | | 11/2001 | Kramer et al. |
| 6,373,950 B1 | | 4/2002 | Rowney |
| 6,510,516 B1 | * | 1/2003 | Benson et al. .............. 713/167 |
| 6,523,067 B2 | * | 2/2003 | Mi et al. .................... 709/229 |
| 6,532,451 B1 | * | 3/2003 | Schell et al. ................. 705/54 |
| 6,565,000 B2 | * | 5/2003 | Sehr ........................... 235/384 |
| 6,571,339 B1 | * | 5/2003 | Danneels et al. ........... 713/201 |
| 6,587,837 B1 | * | 7/2003 | Spagna et al. ................ 705/26 |
| 2001/0000535 A1 | | 4/2001 | Lapsley et al. |
| 2002/0120846 A1 | | 8/2002 | Stewart et al. |

OTHER PUBLICATIONS

Gerck, Ed, Overview of Certification Systems: x.509, PKIX, CA, PGP & SKIP—Do you understand digital certificates? Do you know what they warrant? pp. 1–18, Jul. 18, 2000.

Linn, John, Trust Models and Management in Public–Key Infrastructures; RSA Laboratories, pp 1–13, Nov. 6, 2000.

PKCS #5, v2.0: Password–Based Cryptography Standard, RSA Laboratories, Redwood City, CA; pp 1–30, Mar. 25, 1999.

PKCS #9, v2.0: Selected Object Classes and Attribute Types, RSA Laboratories, Redwood City, CA; pp. 1–34, Feb. 25, 2000.

PKCS #10, v1.7: Certificate Request Syntax Standard, RSA Laboratories, Redwood City, CA; pp. 1–10, May 26, 2000.

PKCS #12, V1.0: Personal Information Exchange Syntax, RSA Laboratories, Redwood City, CA; pp. 1–23, Jun. 24, 1999.

PKCS #15: Conformance Profile Specification; RSA Laboratories, Redwood City, CA; pp 1–8, Aug. 1, 2000.

Pepe, M., Smart Cards Gaining Traction; CRN.com—Point of Sale: Trends, Markets and Technologies; Dec. 31, 2002 (http://cm.channelsupersearch.com/news/cm/39163.asp) Feb. 18, 2003.

Guide to Internet Security; Public Key Cryptography (web site at http://www.e-certify.com/library/pkc_guide.htm) captured on Feb. 18, 2003.

Private Server Product Description; (web site at http://www.bnn.com.tr/assets/cserver_prodesc.html), date of capture Feb. 18, 2003; pp 1–11.

Cylink atm encryptor (web site at http//securitytools.hypermart.net/security_1/cylink_atm_encryptor.html), date of capture Feb. 18, 2003, p1.

Bal's PGP Public Key Server; The Computer Law Resource 1996; (web site at http://www.complaw.com/pgp/webkeyserver.html) date of capture Feb. 18, 2003; pp 1–2.

Baltimore; Solutions; A New Era in Secure and Trusted E-Business; (web site at http://www.baltimore.com/solutions/index.asp) date of capture Feb. 18, 2003; p 1.

(PGP) Pretty Good Privacy; What's? com; Dec. 27, 2000; (web site at http://whatis.techtarget.com/Whatis_Definition_Page/0,4152,214292,00.html) date of capture Dec. 27, 2000; pp 1–3.

An Introduction to Cryptography; Network Associates, Inc. PGP, Version 6.5.1; Jun. 1999; pp. 1–88.

Turnbill, J., "Cross-Certification and PKI Policy Networking"; Entrust, Inc; pp 1–10, Aug., 2000.

Some Suggestions For Automatic Encryption and Identity Verification in the IBM Internal Computing Network; pp 1–13, Dec. 28, 1985.

Arthur, D., AADS Option for Buyer Authentication; Response to NACHA/IC ANT 2 RFI; pp 1–3, Sep. 14, 1998.

Internet Counsel; Consumer Internet Purchases Using ATM Cards Successfully Processed by NACHA Pilot Participants; pp 1–4, Feb. 23, 2003.

Internet Counsel; NACHA to Test ATM Card Payments for Consumer Internet Purchases; pp 1–3, Feb. 23, 2003.

News Release: Digital Signatures Can Secure ATM Card Payments on the Internet, NACHA Pilot Concludes; pp 1–2, Jul. 23, 2001.

Kutler, Jeffrey, Privacy Broker: Likely Internet Role for Banks? Digital Frontiers; pp 1–6, Oct. 8, 1998.

Hettinga's Best of the Month, Journal of Internet Banking and Commerce; Array Development, web site at http://www.arraydev.com/commerce/JIBC/9801–20.htm, pp 1–4, Mar. 31, 1999.

Denny, Stephanie, The Electronic Commerce Challenge, Journal of Internet Banking and Commerce; Array Dev., http://www.arraydev.com/commerce/JIBC/9811–06.htm, pp 1–2, Mar. 31, 1999.

Kaliski, Burton S., Jr., Some Examples of the PKCS Standards, An RSA Laboratories Technical Note, RSA Laboratories, Redwood City, CA., pp 1–15, Nov. 1, 1993.

Kaliski, Burton S., Jr., A Layman's Guide to a Subset of ASN.1, BER, and DER, An RSA Laboratories Technical Note, RSA Laboratories, Redwood City, CA., pp 1–36, Nov. 1, 1993.

PKCS Editor, PKCS #1 v2.1: RSA Cryptography Standard, RSA Laboratories, Draft 2, RSA Laboratories, Bedford, MA, pp 1–60, Jan. 5, 2001.

PKCS #3: Diffie–Hellman Key–Agreement Standard, An RSA Laboratories Technical Note, Version 1.4, RSA Laboratories, Redwood City, CA. pp 1–8, Nov. 1, 1993.

PKCS #6: Extended–Certificate Syntax Standard, An RSA Laboratories Technical Note, Version 1.5, RSA Laboratories, Redwood City, CA. pp 1–11, Nov. 1, 1993.

PKCS #8: Private–Key Information Syntax Standard, An RSA Laboratories Technical Note, Version 1.2, RSA Laboratories, Redwood City, CA. pp 1–5, Nov. 1, 1993.

Wiener, M., Performance Comparison of Public–Key Cryptosystems, Technical Newsletter of RSA Laboratories, a div of RSA Data Security, Inc., Summer 1998, vol. 4, No. 1, pp1–23.

Apostolopoulos, G., Securing Electronic Commerce: Reducing the SSL Overhead, IEEE Network, Jul./Aug. 2000, vol. 14, Issue 4, pp 1–16.

Maurer, Modeling a Public–Key Infrastructure, Sep. 1996, Dept. of Computer Science, Swiss Federal Institute of Technology, pp. 1–26.

Security Requirements for Cryptographic Modules, FIP-Standards Pub. 140–1, pp 1–45, CSL Bulletin for FIPS 140–1 pp 1–6, 2001/2000.

Heroux, M., A Private Key Storage Server for DCE—Functional Specification, Open Software Foundation Request for Comments; 94.1, (http://www.opengroup.org/rfc/mirror) Nov. 1996.

Cox, P., Bench–Marking SmartGate, Establishing the Scaleability of V–ONE's SmartGate Security System, Internet SmartWare Ltd., pp 1–7, Jul. 24, 1997.

Answers to Frequently Asked Questions about Today's Cryptography, RSA Data Security, Inc., Revision 2.0, pp 1–44, Oct. 5, 1993.

Announcing the Standard for Digital Signature Standard (DSS), Federal Information Processing Standards Publication 186, pp 1–18, May 19, 1994.

Boeyen, Sharon, Certificate Policies and Certification Practice Statements, Entrust Technologies White Paper, Version 1.0, pp 1–7, Feb. 1997.

Public–Key Infrastructure (PKI)—The VeriSign Difference, Copyright 1999, VeriSign, Inc. pp 1–21, Feb. 3, 2001.

Moreau, Thierry, Thirteen Reasons to Say 'No' To Public Key Cryptography, Draft paper, CONNOTECH Experts–Conseils, Inc., Montreal, Quebec, Canada, pp 1–5, Mar. 4, 1998.

"X9 Overview," American Bankers Association web page (web site at http://www.x9.org/aboutX9.htm), 1998, date of capture Jan. 11, 1999, 3 pp.

Jul. 1997 Meeting Report, Electronic Payments Forum (web site at http://www.epf.net/PrevMtngs/July97Report.htm), date of capture Jan. 11, 1999, 2 pp.

Kaliski, Burton S., Jr. An Overview of the PKCS Standards, RSA Laboratories Technical Note, RSA Data Security, Inc. Public–Key Cryptography Standards (PKCS), pp 1–27, Nov. 1, 1993.

Public Key Cryptography, NIST Special Publication 800–2, reprinted at http://csrc.nist.gov/publications/nistpubs/800–2/800–2.txt), pp 1–138, Apr. 1991.

Guideline for Implementing Cryptography in the Federal Government, NIST Special Publication 800–21, pp 1–138, Nov. 1999.

Guideline for the Use of Advanced Authentication Technology Alternatives, FIPS Pub. 190, reprinted at http://csrc.nist.gov/publications/fips/fips190/fip190.txt), pp 1–55.

Building a Foundation of Trust in the PC, The Trusted Computing Company Platform Alliance (web site at http://www.trustedpc.org), pp 1–9, Jan. 2000.

Trusted Platform Module (TPM) Security Policy (A Part of the "TCPA Security Policy"), Version 0.45, pp 1–13, Oct. 2, 2000.

Trusted Platform Module Protection Profile (TPMPP) (A Part of the "TCPA Security Policy"), Version 0.45, pp 1–151, Sep. 14, 2000.

TCPA PC Specific Implementation Specification, Version 0.95, pp 1–70, Jul. 4, 2001.

Common Criteria for Information Technology Security Evaluation, Smart Card Security User Group, Smart Card Protection Profile, draft Version 2.1d, pp 1–194, Mar. 21, 2001.

X.9.84–2000, Biometric Information Management Security for the Financial Services Industry, draft version, pp 1–141, Mar. 21, 2001.

Security Requirements for Cryptographic Modules, FIPS Publication 140–2, pp 1–62, May 25, 2001.

Secure Hash Standard, FIPS Publication 180–1, pp 1–24, Apr. 17, 1995.

Digital Signature Standard (DSS), FIPS Publication 186–2, pp 1–72, Jan. 27, 2000.

Entity Authentication Using Public Key Cryptography, FIPS Publication 196, pp 1–52, Feb. 18, 1997.

Computer Data Authentication, FIPS Publication 113, (web site at www.itl.nist.gov/fipspubs/fip113.htm), date of capture Jan. 16, 2001, pp 1–7, May 30, 1985.

Sales Brochure for APPROVEIT, electronic approval management software, by Silanis Technology, Inc., pp 1–12, Jul. 18, 2000.

Public Key Infrastructure, An NSS Group White Paper, by Bob Waider, undated, reprinted http://www.nss.co.uk/WhitePapers/PublicKeyInfrastructure.htm on Jan. 25, 2001, pp 1–18.

Smart Card & Security Basics, Cardlogix, Inc. brochure, Ref. Date Q1–Q2 2000, pp 3–36.

Understanding Public Key Infrastructure (PKI), Technology White Paper, by RSA Security, Inc., 1999, pp 1–10.

Chan, S.C., An Overview of Smart Card Security, reprinted from website http://home.hkstar.com/~alanchan/papers/smarCardSecurity, captured on Jan. 27, 2001, pp 1–7, Aug. 17, 1997.

Taschler, S., Technical Introduction to CIP 3.0, reprinted from website http://www.datakey.com/cardpage/cip.htm, captured on Jan. 25, 2001, pp 1–6, Sep. 30, 1997.

Smart Cards: Enabling Smart Commerce in the Digital Age, CREC/KPMG White Paper (Draft), pp 1–22, May 1998.

List Serve Posting dated Dec. 29, 1999 regarding Attacks on PKI, Dec. 29, 1999.

List Serve Posting dated Dec. 30, 1999 regarding Attacks on PKI, Dec. 30, 1999.

List Serve Posting dated Feb. 7, 2000 regarding Questions about PKI, Feb. 7, 2000.

List Serve Posting dated Feb. 14, 2000 regarding Real-Names Hacked—Firewall Issues, Feb. 14, 2000.

List Serve Posting dated Dec. 3, 1998 regarding EU Digital Signature Initiative Stalled, Dec. 3, 1998.

List Serve Posting dated Dec. 12, 1999 regarding QC Bio–Info Leak?, Dec. 12, 1999.

List Serve Posting dated Apr. 2, 2000 regarding Biometrics and Electronic Signatures, Apr. 2, 2000.

List Serve Posting dated Dec. 11, 1998 regarding AADS Strawman, Dec. 11, 1998.

List Serve Posting dated May 24, 1999 regarding [ECARM] Cardtech / Securetech & CA PKI, May 24, 1999.

List Serve Posting dated May 25, 1999 regarding [ECARM] Cardtech / Securetech & CA PKI, May 25, 1999.

List Serve Posting dated May 30, 1999 regarding [ECARM] Cardtech / Securetech & CA PKI, May 30, 1999.

List Serve Posting dated Jul. 16, 1999 regarding Common Misconceptions, was Re: KISS for PKIX, Jul. 16, 1999.

List Serve Posting dated Aug. 15, 1999 regarding Risk Management in AA / draft X9.59, Aug. 15, 1999.

"X9.59 Working Draft" ABA; American National Standard X9.59–199X, For the Financial Services Industry: Account–Based Secure Payment Objects, pp 1–26, Sep. 25, 1998.

Account Authority Digital Signature Model web page (http:www.garlic.com/~lynn/aadsover.htm) believed available at website after Nov. 8, 1997, date of capture Oct. 2, 2001, 5 pp.

"How PGP Works," web pages from www.pgpi.org, containing basic information.

PGP Certificate Server, Total Network Security, Network Associates, 3965 Freedom Circle, Santa Clara, CA 95044–1203.

"PGP Desktop Security 7.0," PGP Security, 3965 Freedom Circle, Santa Clara, CA 95054–1203.

"Policy Management Agent for SMTP," Network Associates, 3965 Freedom Circle, Santa Clara, CA 95054–1203.

"Inside PGP Key Reconstruction: Technical Details," Revision by Will Price, dated Jul. 25, 2000, A PGP Security, Inc. White Paper.

Stewart, D., "Account Authority Digital Signatures: Enabling Secure Internet Transactions via Existing Payment Processes & Infrastructure," www.garlic.com/~lynn/aadsw-p.htm.

O'Mahoney, "Electronic Payment Systems," Artech House, Inc., pp. 51 and 77–80 (1961).

* cited by examiner

ABDS SYSTEM AND VERIFICATION STATUS FOR AUTHENTICATING ENTITY ACCESS

CROSS REFERENCE TO RELATED APPLICATIONS

The present application is a continuation of and claims priority under 35 U.S.C. § 120 to international patent application Ser. No. PCT/US01/24567 filed Aug. 6, 2001, published in English, which is the nonprovisional of and claims priority under 35 U.S.C. 119(e), and under the Paris Conventional worldwide, to the benefit of the filing date of Wheeler et al. U.S. provisional patent application Ser. No. 60/223,076 filed on Aug. 4, 2000, both of which are incorporated herein by reference. This application also incorporates herein by reference each of four international patent applications and three U.S. patent application to Anne and Lynn Wheeler filed in the U.S. Patent & Trademark Office on Aug. 6, 2001, and bearing Ser. No. PCT/US01/41587 (titled "Person-Centric Account-Based Digital Signature System") and Ser. No. 09/923,179 (titled "Account-Based Digital Signature (ABDS) System") (hereinafter such pair of applications being referred to as the "ABDS Applications"); Ser. No. PCT/US01/41562 (titled "Entity Authentication in Electronic Communications by Providing Verification Status of Device") and Ser. No. 09/923,075 (titled "Modifying Message Data and Generating Random Number Digital Signature Within Computer Chip") (hereinafter such pair of applications being referred to as the "VS Applications"); Ser. No. PCT/US01/24572 (titled "Linking Public Key of Device to Information During Manufacture") and Ser. No. 09/923,213 (titled "Manufacturing Unique Devices That Generate Digital Signatures") (hereinafter such pair of applications being referred to as the "PRiMR Applications"); and Ser. No. PCT/US01/24563 (titled "Trusted Authentication Digital Signature (TADS) System") (hereinafter referred to as the "TADS Application").

BACKGROUND OF INVENTION

The present invention generally relates to authenticating an entity and granting access to a controller resource and, in particular, to authenticating the entity utilizing secure electronic communications and one or a plurality of different authentication factors.

Access to various controlled resources such as buildings, financial accounts and confidential information/data is provided by numerous techniques, ranging from physical keys, such as the common house key, to security cards and personal identification numbers (PIN), such as the typical bank account ATM card. Keys and low security cards merely require possession of the key or card by the party desiring access to the controlled resource. The mere possession of the key or card thus provides one factor for authenticating access, hereinafter "authentication factor". This authentication factor could be used for example, in granting access to a security gate around a physical plant or access to a parking lot to the plant. Often, the access into the lot or gate is just the first desired level of security. Authenticating access to specific buildings can require a second or stronger authentication factor in addition to the simple key or card.

Requiring additional information, in addition to just possession of the key/card can provide the second authentication factor. An ATM card or credit card typically requires both possession of the card and knowledge of personal or secret information, such as the PIN. By requiring both possession of a card and knowledge of the personal/secret information the second authentication factor can be provided. For example, authenticating access to a specific building can require both possession of the card and then entry of the PIN. For authenticating access to specific rooms within the building or computer access, a further authentication factor can be required, such as inputting personal information/data relating to charcteristics of the requesting entity themselves.

This higher/stronger authentication factor then requires entry of something the party is, such as biometric information, for example, fingerprints, voice data or a retinal scan or combinations thereof. This higher authentication factor requires possession of a card, knowledge of information (PIN) and presentation of the personal biometric information. This biometric input can be required for authenticating entry into specific rooms, such as accounting, computer center, etc. A further biometric entry could be required for authenticating access to not just read the accounting information or use the computers, but to change the accounting information or to have access to particular databases within the computer or computer system.

Another type of authentication factor can be provided by a security profile of the card or device itself. The cards or devices can be manufactured in secure facilities providing a manufacturing history, can be manufactured with a variety of security characteristics, which protect the card from being analyzed or otherwise attacked to obtain the information stored the rein and can include various authentication capabilities. The security characteristics themselves then can be utilized as another authentication factor in authenticating access or can be used in combination with the other authentication factors.

It would be desirable to utilize one or more of these authentication factors over an unsecured communication medium, such as the Internet to provide access authentication to a requesting entity. Further, most controlled resources currently include some type of access authentication combined with some type of access authorization/control for granting access to the controlled resource. The access authorization/control systems can be vary complex and include numerous well known types of systems. It would be desirable to utilize one or more of the referenced authentication factors for access authentication of the requesting entity in combination with the access authorization/control of the controlled resource to grant access. In some instances, it would further be desirable for the access authentication component to also be used in place of the separate access authorization/control system to both authenticate the entity and to grant access.

As used herein, an electronic communication ("EC") is considered to be any communication in electronic form. ECs have become an integral part of transacting business today, especially with the growth of the Internet and e-commerce. An EC can represent, for example, a request for access to information or a physical space or a financial transaction, such as an instruction to a bank to transfer funds.

Over recent years, digital signatures also have become an important part of e-commerce. The origination of a digital signature generally includes: (1) the calculation of a message digest-such as a hash value; and (2) the subsequent encryption of the message digest. The message digest is digitally signed by an electronic device using a private key (PrK) of a key pair used in public-private key cryptography (also known as asymmetric cryptography). The resulting ciphertext itself usually constitutes the digital signature, which typically is appended to the message to form the EC.

The second part of originating the digital signature—using encryption with a private key—is referred to herein as "generating" the digital signature, and the combined two steps is referred to herein as "originating" the digital signature. Furthermore, while the generation of the digital signature is conventionally understood as the encryption of the message digest, it is contemplated herein that generating the digital signature also may include simply encrypting the message rather than the message digest. Digital signatures are important because any change whatsoever to the message in an EC is detectable from an analysis of the message an the digital signature. Decryption of the message is accomplished by using the public key (PuK), as is well known.

For example, a message digest may be calculated by applying a hashing algorithm—such as the SHA-1 algorithm—to the message. The hashing algorithm may be applied either within the device or external to the device with the resulting hash value then being transmitted to the device for generation of the digital signature. In order to perform Message Authentication, the recipient of the EC (in this case, the authenticating component) must know or be able to obtain both the identity of the hashing algorithm applied to the message as well as the public key ("PuK") corresponding to the private key used to encrypt the message digest. With this knowledge, the authenticating component applies the appropriate hashing algorithm to the message to calculate a hash value, and the authenticating component decrypts the digital signature using the public key. If the hash value calculated by the authenticating component equals the hash value of the decrypted digital signature, then the authenticating component determines that the content of the message contained in the EC was not altered in transmission, which necessarily would have changed the hash value.

A digital signature also enables an authenticating component to authenticate the sender of the EC, which is another valuable tool for determining whether the requesting entity should be given access to the control resource. For example, performing Message Authentication enables the authenticating component to authenticate the sender of the EC to the extent that the authenticating component thereby confirms that the sender of the EC possessed the private key corresponding to the public key used successfully to authenticate the message. This is one type of entity authentication and is based on what the requesting entity "has" (hereinafter referred to as "Factor A Entity Authentication"). Factor A Entity Authentication is useful when the authenticating component has trusted information regarding the identity of the owner of the private key. Such trusted information may arise from a digital certificate issued by a trusted third party that accompanies the EC and binds the identity of the private key owner with the public key, or such trusted information may arise from actual knowledge of the identity of the private key owner, such as in the case where the authenticating component itself has issued the private key or device containing the private key to the owner.

To guard against fraudulent use of a device through theft of the device itself, a personal identification number (PIN), password, or passphrase (collectively referred to herein as a "Secret") is typically prestored within the device and must be input into the device before it will operate to generate digital signatures. Alternatively, the Secret is shared with the authenticating component beforehand and, when the EC later is sent to the authenticating component, the Secret also is sent to the authenticating component in association with the message. In the first case, verification of the Secret authenticates the user of the device (hereinafter "User Authentication"), and in the second case, verification of the Secret authenticates the sender of the EC (hereinafter "Sender Authentication"). In either case, confirmation of the Secret represents entity authentication based on what the requesting entity "knowns" (hereinafter "Factor B Entity Authentication"). The transmission of the Secret in a M may require encryption of the Secret to prevent divulging of the Secret.

Another countermeasure against fraudulent use of the device through physical theft includes the verification of a biometric characteristic-like a fingerprint—of the user of the device or sender of the EC. This type of authentication is based on what the requesting entity "is" (hereinafter "Factor C Entity Authentication"). As with the Secret, a biometric value is either maintained within the device for User Authentication, or is shared with the authenticating component beforehand for Sender Authentication by the authenticating component.

Notwithstanding all of the above, there is a currently a need for a system in which the requesting entity and the device used by the requesting entity to generate a digital signature for an EC representing a request for access to a controlled resource are "linked" with an account in an account database maintained by the authenticating component whereby the requesting entity pre-registers the public key corresponding with the private key retained securely within the device with the authenticating component and whereby the authenticating component is able to perform Factor A Entity Authentication based on a digital signature generated by the device.

Additionally, a need exists for a system that provides for both User Authentication as well as for Sender Authentication using either or both of Factor B Entity Authentication and Factor C Entity Authentication, and all without requiring the authenticating component to safeguard either a Secret or a biometric value. In this regard, a need exists for such a system in which Factor B Entity Authentication and Factor C Entity Authentication can be reliably inferred by the authenticating component without the authenticating component being privy to the authenticating information, thereby addressing privacy concerns. Furthermore, a need exists in such a paradigm for the authenticating component to be able to determine, in its own subjective business judgment, what constitutes a successful biometric match when Factor C Entity Authentication is used. A need also exists for such a paradigm in which the authenticating component is able to monitor repeated attacks on a device to guess a Secret or a biometric value, and for such a paradigm that further accommodates the use of a single device for the sending of ECs to various, unrelated authenticating components.

Further, a need exists for a system by which the security features and manufacturing history of a device are securely linked with the device whereby the authenticating component is able to determine reliably the likelihood or risk that the device used to generate a digital signature for a message that authenticates is not a counterfeit.

Accordingly, a need exists for the capability to utilize a secure ED in an insecure communication medium to provide the desired authentication factors to authenticate access to controlled resources, in combination with or in place of access authorization/control systems which grant access to the controlled resources.

SUMMARY OF INVENTION

The present invention provides different types of authentication factors used for authenticating access to a controlled resource to a requesting entity or account holder by sending an EC to an access authentication component of an account authority. The requesting entity initially opens a security account with the access authentication component and provides at least a PuK of a PuK-PrK key pair of the requesting entity. The account authority establishes and maintains a database including a unique identifier associated with the PuK and information relating to the security account of the requesting entity. The requesting entity requests access to the controlled resource, such as by digitally signing a M with the PrK and sending an EC with the unique identifier to the access authentication component. The access authentication component obtains the PuK associated with the unique identifier and authenticates the M. If the M authenticates, the access authentication component authenticates the requesting entity for access to the controlled resource.

The PuK-PrK key pair of the requesting entity can be maintained in a secure device and the M can be digitally signed using the device. The device also can include personal verification data, such as confidential information or biometric data or both, which can be utilized to form a verification status or a plurality of statuses, when the requesting entity enters the data into the device. The verification status or indicators then can be sent directly to or with the EC and then be used by the access authentication component as factors to authenticate the requesting entity for access to the controlled resource. Once the access authentication component authenticates the requesting entity, the access authentication component can output an access authentication signal for use by the account authority.

The device also can be associated with a security profile of the device itself, which then can be associated with the security account of the requesting entity in the account authority. The security profile of the device then can be used by the access authentication component in determining the risk of authenticating the requesting entity, for access to the controlled resource. Further, both the security profile and one or more of the verification statuses can be sent directly to or with the EC and used by the access authentication component for evaluating the risk of authenticating the requesting entity for access. If any one of the authentication steps fails or the risk assessment is too high, then the access authentication component can send a rejection to the requesting entity.

Both the verification status and the security profile can also be used directly by the access authentication component without separately using a digital signature. The business rules established for the access authentication component or the controlled resource can require a reconfiguration of the security profile or resubmission of the verification status or a new/different verification status for a new transaction during a session or following a preset expiration period for the reconfirmation of the security profile or verification status during a session. Further either the verification status or the security profile can be utilized as a precursor for the access authentication of the present invention.

The access authentication signal of the authenticated requesting entity then can be used in combination with an access authorization/control of the controlled resource. The access authorization/control then grants access to the requesting entity to the controlled resource in accordance with business rules established for access to the controlled resource. Alternatively, the access authentication component also can directly grant access using the business rules in place of the access authorization/control of the controlled resource.

BRIEF DESCRIPTION OF DRAWINGS

Benefits and further features of the present invention will be apparent from a detailed description of preferred embodiment thereof taken in conjunction with the following drawings, wherein like elements are preferred to with like reference numbers, and wherein.

DETAILED DESCRIPTION

Figure 1:
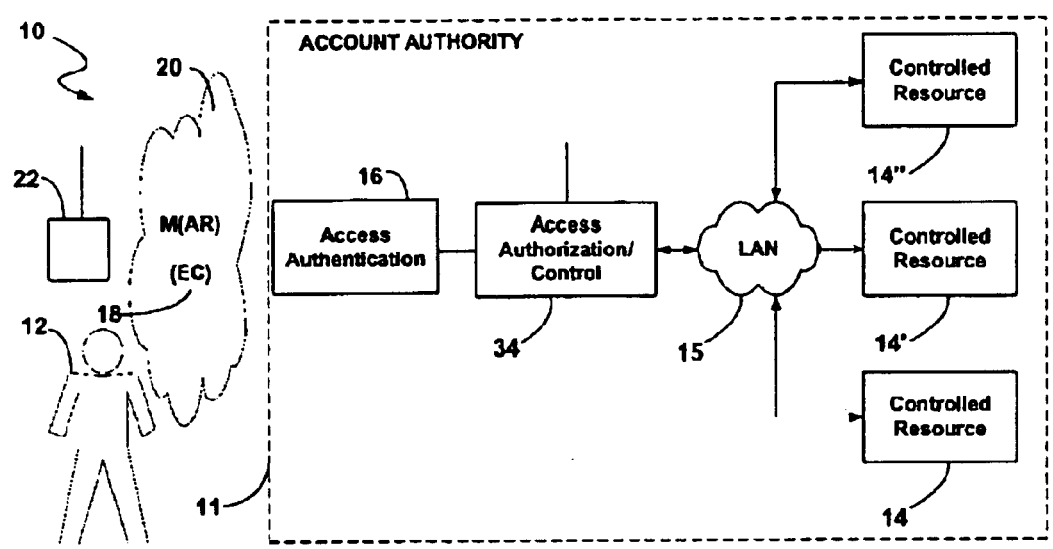
FIG. 1 illustrates a block diagram of a general authentication embodiment of the present invention.

As a preliminary matter, those persons skilled in the art readily will understand that, in view of the following detailed description of the preferred devices and methods of the present invention, the present invention is susceptible of broad utility and application. Many methods, embodiments, and adaptations of the present invention other than those herein described, as well as many variations, modifications, and equivalent arrangements, will be apparent from or reasonably suggested by the present invention and the following detailed description thereof, without departing from the substance or scope of the present invention. Accordingly, while the present invention is described herein in detail in relation to preferred methods and devices, it is to be understood that this detailed description only is illustrative and exemplary of the present invention and is made merely for purposes of providing a full and enabling disclosure of the invention. The detailed description set forth herein is not intended nor is to be construed to limit the present invention or otherwise to exclude any such other embodiments, adaptations, variations, modifications and equivalent arrangements of the present invention, which is limited solely by the claims appended hereto and the equivalents thereof.

As used herein, an EC from an account holder or requesting entity to an account authority preferably includes both a message (M) and a digital signature of the message (DS (M)). The message preferably includes a unique account identifier (AcctID) and an instruction for the account authority to perform in relation to the account. As used herein, an "account holder" or "requesting entity" is generally any person who can generate a digital signature using a PrK, such as by possessing a device that is capable of generating a digital signature using a provide key retained therein. The private key used corresponding with a public key associated with an account upon which the person is authorized to act. An "account authority" is generally a person, entity, system, or apparatus that maintains such an account on behalf of the requesting entity or account holder. In some embodiments, the "requesting entity" or "account holder" is, itself, a device that is capable of generating a digital signature using a private key retained therein; the private key corresponding with a public key associated with an account upon which the device is authorized to act.

In many circumstances, however, it is not necessary for the message to contain the unique account identifier. For example, the account authority may have already obtained the unique account identifier from a previous message from the account holder and retransmission of the account identifier is unnecessary for a follow-up message from the same account holder—as long as the account authority knows that it is communicating with the same account holder (i.e., by means of a session key or identifier or during a continuous, uninterrupted electronic connection between the two). Further, it is not always necessary for the message to contain an instruction, such as, for example, when the instruction is implicit in the mere communication between the account holder and the account authority (e.g., an instruction in an EC sent to a parking gate controller obviously implies an instruction to "open the parking gate").

ECs, and the ability to authenticate the sender or requesting entity of an EC, are useful for at least three different business purposes within the present invention. These three different purposes are described generally hereinafter as "session authentication," "transaction authentication," and "transaction confirmation." Session authentication and transaction authentication are similar to each other since both typically involve situations in which the account holder must "prove" (at least to the extent possible based on the strength of the entity authentication) to the account authority that he is the legitimate account holder. In contrast, transaction confirmation typically involves situations in which the account holder has already proven to the account authority that he is the legitimate account holder; however, the account authority requires specific confirmation of the digitally-signed message from the account holder before the account authority will perform a requested action (typically, upon the account itself) in response to a specific instruction contained within the message.

Session authentication and transaction authentication are generally necessary before the account authority will grant the account holder access to the account of the account holder or to another resource to which the account holder has rights. Such authentication is also generally necessary before the account authority or accessed resource will perform a requested action on the account or resources. A controlled resource is, for example, a physical space, database, computer file, data record, checking account, computer system, computer program, web site, or the like. A main distinction between session authentication and transaction authentication is what the account authority does are a result of such authentication. For example, once the account holder is authenticated for session authentication purposes, the account authority grants the account holder access (by way of a session key, entity identifier, and the like) to the requested account or controlled resource for the duration of the "session." The meaning of a session varies depending upon the type of account or controlled resource being accessed and depending upon the business rules of the particular account authority maintaining the account or resource; however, a session typically means some period of time during which the account holder is allowed to perform actions on or within the account or resource without providing additional authentication to the account authority. In addition, the type or amount of access to the account or resource an account holder is granted is also governed by the business rules of the particular account authority and may vary from account authority to account authority and from account to account.

In contrast, transaction authentication is typically only useful for the particular transaction with which it is associated. Transaction authentication associated with a particular transaction is not "carried over" for use with another transaction. Such a transaction may be a request for the account authority to perform a specific action on the account or resource (e.g., a request for the account authority to "provide checking account balance" or "open the door"). In contrast with transaction confirmation (described in the next paragraph), however, transaction authentication is useful when the account authority does not specifically need to know the "intent" of the account holder before performing the requested action.

Transaction confirmation, on the other hand, is useful when the value or risk associated with a particular transaction rises to the level that the account authority will not act unless it receives sufficient assurance that the account holder actually intended to send and digitally sign the message and, correspondingly, intended for the account authority to act in reliance thereupon. Since a digital signature is capable of being generated by a device, potentially without the desire or even knowledge of the owner or user of the device, intent cannot be presumed from the mere receipt of a digital signature from a device of the account holder. For this reason, some way of confirming the account holder's intent with respect to a specific transaction is needed. Such transaction confirmation is preferably obtained by a physical, overt act performed by the account holder that is determinable within the message received by the account authority. For example, in some instances, the contemporaneous provision of Factor B or C entity authentication information by the account holder in conjunction with the message that is digitally signed can imply confirmation or intention. Another method of obtaining such transaction confirmation is through the deliberate and recognizable modification by the account holder of a "proposed" or" confirmation message generated by the account authority, which is then digitally signed by the account holder.

In light of the above, it should e understood that in many circumstances, even if the account holder has already provided entity authentication information for the purpose of session authentication, it may be necessary for the account holder or requesting entity to provide additional and/or stronger entity authentication information (still for session authentication purposes) before the account authority will provide the account holder, for example, with access to a more restricted portion of the particular account or resource or to another more restricted account or resource. Further, it should also be understood that even during a particular session, it may be necessary for the account holder to provide entity authentication information to the account authority either for transaction authentication purposes (when the transaction requires a stronger level of entity authentication that the particular session required) or for transaction confirmation purposes (when the account authority desires specific assurance of the account holder's intent before performing the requested action). In addition, it should also be understood that a single EC communicated from an account holder to an account authority may be used simultaneously for both transaction authentication and for transaction confirmation purposes in many circumstances.

Once the authenticating component has authenticated the requesting entity, then access can be granted directly by the authenticating component or by an access authorization/control component of or associated with the account authority. The party granting access to the requesting entity does so in accordance with business rules established with the account authority for the controlled resource which is to be accessed. The business rules are based upon the security level, which is required or defined for the controlled resource. For example, a parking lot would typically have a fairly low security level, while a nuclear research laboratory which might be accessed from the parking lot would have a high security level required to grant access. The business rules include gauging the risk of granting access to the controlled resource. The risk can be evaluated using a variety of risk elements, such as the permission profile of the requesting entity, the security profile of a device sending the M, the account history of transactions including geographical history of the EC inputs, the environment in which the EC occurred, the authentication factors used for the access authentication, the controlled resource being accessed, the input/output (I/O) support element or mechanism for the EC input, the type of communication network used, such as a secure Internet or the unsecured Internet and other related security information.

Referring now to FIG. 1, a general access authentication system embodiment of the present invention is designated generally by the reference numeral 10. The access authentication system 10 includes an account authority 11, which may include some or all of the following components or may only be associated therewith. Further, although given only a single reference numeral 11, for description purpose, the account authority 11 may include several associated account authorities at the same or separate locations within the scope of the present invention. A requesting entity or account holder 12 desires access to one or more of a plurality of controlled resources 14, 14' and 14", which again may be part of or associated with the account authority 11. The controlled resources 14 may be any restricted access resource, such as an information repository, a computer or computer system/database or a financial institution, as will be described in further detail hereinafter. In the system 10, the controlled resource 14 will be described as a plurality of computer systems, which can be accessed over a local area network (LAN) 15. The controlled resources 14 have the access to them authenticated by an access authentication component 16. The requesting entity 12 sends an access request (AR), including an explicit or implicit M, which can be in the form of an EC 18 to the access authentication component 16 via a communication medium 20, such as the Internet, an Intranet or physical wiring.

The requesting entity 12 sends the AR which requests access to one or more of the controlled resources 14. Where used, the EC 18 includes a message (M), which again can be just the AR. The requesting entity 12 digitally signs the M, using a PrK of a PuK-PrK key pair, which is securely held by the requesting entity 12. The PrK preferably is not known to anyone other than the requesting entity 12 and can provide one of the authentication factors for use in the system 10. One preferred method of securely holding the PuK-PrK key pair is to contain the pair within a secure device 22, which is kept by the requesting entity 12. The device 22 at least contains the PuK-PrK key pair and can be used to digitally sign the M. Details of embodiments of the device 22, which can be utilized in the present invention, are described in detail in the VS applications incorporated by reference herein.

Before the EC 18 can be sent to the access authentication component 16, the requesting entity 12 first opens a security account with the account authority 11. A security account, as used herein, is defined as the creating or opening of an account with the access authentication component 16 and/or the account authority 11. The security account including various information relating to the requesting entity 12 and/or related business information along with the PuK of the requesting entity 12. The security account is used herein for the purposes of authenticating the requesting entity 12. The security account includes at least one record including the PuK in a database related to the requesting entity 12, as will be more fully described with respect to FIG. 3. The access authentication component 16 will require one or more authentication factors to be presented by the requesting entity 12 to authenticate access for the requesting entity 12 to the LAN 15 and hence to the controlled resources 14. Further, the authentication factors required can be different for access to the different systems 14, 14' and/or 14". The authentication factors for authentication can be sent directly to the access authentication component 16 or with the EC 18. Once the access authentication component 16 has received the proper authentication factor(s) from the requesting entity 12, the access authentication component 16 will authenticate the requesting entity 12 for access. When the access authentication component 16 has authenticated the requesting entity 12, access authentication component 16 will generate an access authentication signal for use by the account authority 11 and/or the controlled resources 14. The access authentication signal may only indicate that the requesting entity has been authenticated in a simple binary format (yes/not) signal, or the access authentication signal can include all the authentication and other information received from the requesting entity 12, for further use by the account authority 11. The access authentication component 16 is authenticating "who are you" of the requesting entity 12 for use by the account authority 11 and/or the controlled resources 14. The access authentication component 16 also may only authenticate the requesting entity 12 with whatever factors that are presented by the requesting entity 12, without knowing or having access to the rules required by the controlled resources 14 for the proper authentication factor(s).

The LAN 15 and the controlled resources 14 generally will include one or more access authorization/control 34 (only one of which is illustrated in FIG. 1). The access authorization/control 34 will receive the access authentication signal from the access authentication component 16, which preferably include the authentication factors presented by the requesting entity 12 and acted upon by the access authentication 16. The access authorization/control 34 will grant access to the requesting entity 12, directly or through the access authentication component 16, based upon the permission associated with the requesting entity 12 (the permission also being established in advance with the account authority 11, the LAN 15 and/or the controlled resources 14). Access is granted, for example, in accordance with a set of business rules including the risk evaluation established for access to the LAN 15. Here, the rules can require one of the various authentication factors of the present invention and evaluation of one or more of the enumerated risk elements. If the access authentication signal represents an acceptable authentication factor and the required business rules and risk elements are satisfied, then the LAN 15 grants access to the requesting entity 12. If the AR was to access the system 14, then the LAN 15 can forward the access authentication signal to the system 14. If the access authentication, permission profile of the requesting entity 12 and the risk evaluation also is acceptable to the rules for the system 14, then access also is granted to the requesting entity 12 to the system 14. If, on the other hand the access authentication signal is not acceptable to the LAN 15 or the system 14, then they may request that a higher authentication factor be entered by the requesting entity 12 or just that the same authentication factor be reconfirmed by the requesting entity 12, before access is granted.

Once access has been granted to the system 14, the requesting entity 12 may request a specific transaction, such as reading a specific record relating to the requesting entity 12. Alternately, once access is granted by the system 14, the system 14 can send a transaction request to the party 12 requesting what instruction or transaction that the party requests. In either case, the system 14 may require, by the rules established for the transaction, that the requesting entity 12 confirm the transaction request. The system 14 then will send a confirmation request to the requesting entity 12, directly or through the access authentication 16. The requesting entity 12 will send the confirmation, such as a reentry of the initial access authentication factor or a higher authentication factor back to the system 14, depending on the rules of the system 14, which then will authorize the transaction, presuming that the confirmation is correct. The confirmation also can be a unique or include a unique message to ensure that the AR is not fraudulent, such as a replay attack. The requesting entity 12 can access the other systems 14' and/or 14" in a similar manner, with the same or different access security requirements or rules, as established for each of the systems 14' and 14".

Figure 2:
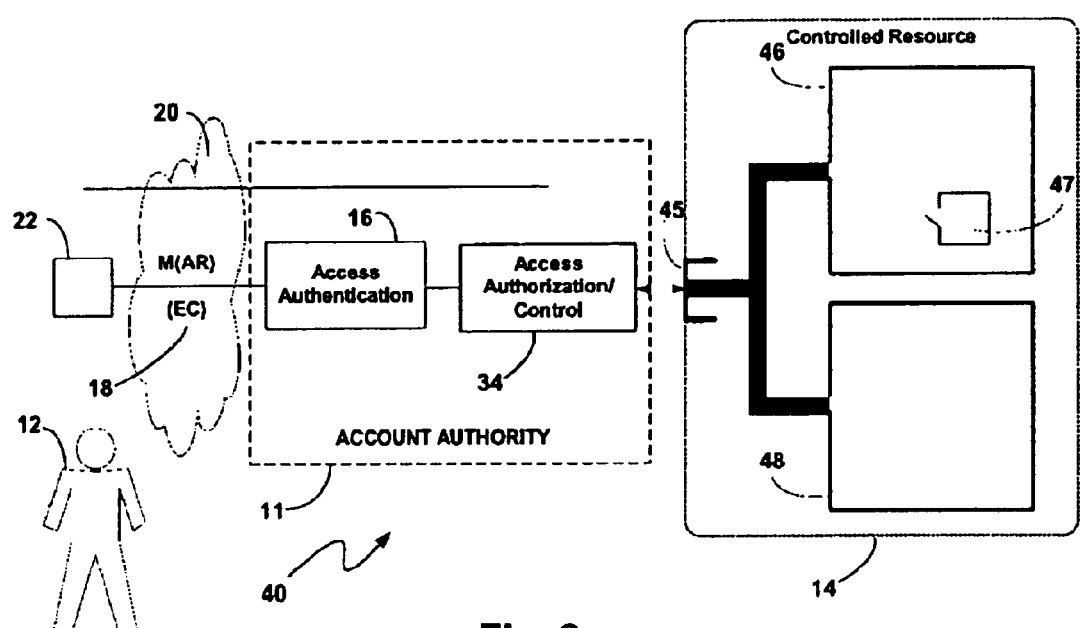
FIG. 2 illustrates a block diagram of a general physical space authentication embodiment of the present invention.

Referring now to FIG. 2, a general physical space access authentication system embodiment of the present invention is designated generally by the reference numeral 40. The access authentication system 40 includes a requesting entity 12 who desires access to one or more of a plurality of controlled resources 14 and has previously established permission with one or more of the controlled resources 14. In this embodiment, the controlled resources 14 are associated with the account authority 11, but are not a part of the account authority 11. The controlled resource 14 may be any restricted physical space, such as a plant or compound wherein the controlled resource 14 represents a perimeter fence or wall with a gate 45 providing access to the interior of the plant 14. Within the plant 14 is a secure building 46, including a secure room 47 therein. The plant 14 can also include one or more other controlled resources 14, such as a building 48. The controlled resources 14 again have the access to them authenticated by an access authentication component 16. The requesting entity 12 sends an access request (AR), such as an EC 18 to the access authentication component 16 via a communication medium 20, such as the Internet, an Intranet or physical wiring.

The requesting entity 12 sends the AR which requests access to one or more of the controlled resources 14. Where used, the EC 18 includes a message (M), which again can be just the AR. The requesting entity 12 digitally signs the M, using a PrK of a PuK-PrK key pair such as with the device 22. The device 22 at least contains the PuK-PrK key pair and can be used to digitally sign the M again, before the M can be sent to the access authentication component 16, the requesting entity 12 first opens a security account with the account authority 11 and with the access authentication component 16. The security account includes at least one record including the PuK in a database related to the requesting entity 12, as will be more fully described with respect to FIG. 3. The access authentication component 16 will require one or more authentication factors to be presented by the requesting entity 12 to authenticate access to the controlled resources 14. Further, the authentication factors required can be different for access to the different buildings 46 and 48 and the room 47. Once the access authentication component 16 has received the proper authentication factor(s) from the requesting entity 12, the access authentication component 16 will authenticate access for the requesting entity 12. The access authentication component 16 is authenticating "who are you" for the requesting entity 12 and again may not known what factors are required for the access to the controlled resource 14.

The controlled resources 14 generally will have one or more access authorization/control 34 (only one of which is illustrated in FIG. 2). The access authorization/control 34 will receive the access authentication signal from the access authentication component 16 and will grant access to the requesting entity 12, directly or through the access authentication component 16. Access is granted, for example, in accordance with a set of business rules established for access to the controlled resource 14. Here, the rules can require one of the various authentication factors of the present invention. If the access authentication signal represents the acceptable authentication factor(s) and any other business rules and risk elements are satisfied, then the controlled resource 14 will grant access to the requesting entity 12, such as by opening the gate 45. Confirmation can be requested, but generally would not be required, since the only action requested is for entry into the physical space 14. If the AR was to access the plant 14 and the building 48, then the access authorization/ control 34 can forward the access authentication signal to the building 48. If the access authentication signal also is acceptable to the rules for the building 48, then access also is granted to the requesting entity 12 for the building 48. If, on the other hand the access authentication signal is not acceptable to the rules of the building 48 or does not satisfy a risk element, then the access authorization/control 34 can request that a higher or another authentication factor by entered by the requesting entity 12 or just that the same authentication factor be reconfirmed by the requesting entity 12, before access is granted.

The requesting entity 12 also may request access to the buildings 46 or 48, by directly presenting the card 22 to a point of access authorization at each building 46, 48 (not illustrated in FIG. 2). The authentication factor(s) already presented by the device 22 for the access authentication signal may still be sufficient for granting access to the building 48. The building 46 however may require by its rules a higher or different or multiple authentication factors to be entered by the requesting entity 12. In that case, the requesting entity 12 can enter the additional/higher authentication factor (s) at the point of access for the building 46. Presuming that the authentication factor entered is sufficient, access is then granted to the building 46. Within the building 46, the room 47 can require a reconfirmation of the access authentication signal or another authentication factor, which can be entered by the requesting entity 12 to gain access in a similar manner. The access authentication component 16 also may directly grant access to the controlled resources 14, in place of the access authorization/control 34, where desired. In the described embodiment 40, authentication to the plant 14 can be a session authentication, while entry to the buildings 46 and 48 and the room 47 are transaction authentications.

Figure 3:
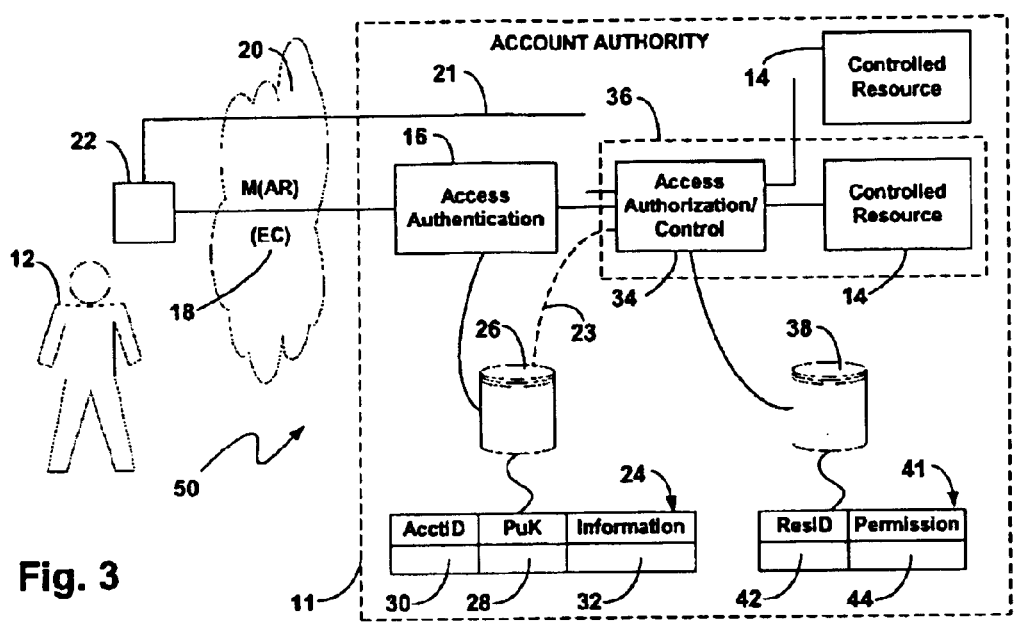
FIG. 3 illustrates a block diagram of a first account based embodiments of the present invention.

Referring now to FIG. 3, a first authentication factor account based access authentication system embodiment of the present invention is designated generally by the reference numeral 50. The access authentication system 50 includes a requesting entity 12 who desires access to one or more controlled resources 14. The controlled resources 14 may be any restricted access resource, such as a physical space, an information repository, a computer or computer system/database or a financial institution, as will be described in further detail hereinafter. The controlled resource 14 has the access to it authenticated by an access authentication component 16. The requesting entity 12 sends an access request (AR) including an authentication factor directly or in the form of an EC 18 to the access authentication component 16 via a communication medium 20, such as the Internet, an Intranet or physical wiring. The access authentication component 16 uses the authentication factor presented by the party 12 to authenticate "who the party is".

The EC 18 includes a message (M), such as just the AR. The requesting entity 12 digitally signs the M, using a PrK of a PuK-PrK key pair, which is securely held by the requesting entity 12. The PrK preferably is not known to anyone other than the requesting entity 12 and provides the possession authentication factor of the system 50. One preferred method of securely holding the PuK-Prk key pair is to contain the pair within a secure device 22, which is kept by the requesting entity 12. The device 22 at least contains the PuK-PrK key pair, can be used to digitally sign the M and preferably can export only the PuK. Details of embodiments of the device 22, which can be utilized in the present invention, are described in detail in the VS applications incorporated by reference herein.

Before the M can be sent to the access authentication component 16, the requesting entity 12 opens a security account with the account authority 11 and the access authentication component 16. The security account includes at least one record 24 related to the requesting entity 12. The security account and the record 24 preferably are established and maintained in a database 26 by the account authority 11, illustrated with the access authentication component 16. Details of embodiments of the database 26 and the operations thereof, which can be utilized in the present invention, are described in detail in the ABDS and VS applications incorporated by reference herein. The access authentication component 16 obtains the PuK of the requesting entity 12 and stores it in the record 24 in a PuK field 28. The access authentication component 16 associates the record 24 and therefor the PuK with a unique account identifier or AcctID, stored in a field 30 in the record 24. The PuK can be used for the AcctID, in which case the record 24 would only contain the field 28 and not the field 30. The record 24 also can include an information field 32, which is associated with the security account of the requesting entity 12 and can include various information related to the requesting entity 12 and/or the account.

The controlled resources 14 generally will have their own access authorization/control 34, separate from the resource 14 or as a part thereof, as indicated by a block 36. The access authorization/control 34 will receive the access authentication signal from the access authentication component 16 and will grant access to the requesting entity 12, directly or through the access authentication component 16. Access is granted, for example by accessing a database 38. The database 38 includes at least one record 41. The record 41 includes a controlled resource identifier ResID in a field 42 and the associated permission in a field 44, associated with the requesting entity 12. The permission includes a set of business rules for the particular application and can be the permitted level of access to the controlled resource 14 and/or other information regarding the account such as financial or business records to be accessed by the requesting entity 12. For example, the permission rules or profile for a computer file access may be read only, execute only or write only or combinations thereof. The access authorization/control 34 can request a reconfiguration of the authentication factor or of the AR from the requesting entity 12 directly over a link 21. The access authorization/control 34 then must access the record 24 to authenticate the reconfirmation. The access authorization/control 34 can access the database 26 and the record 24 through the access authentication component 16 or directly over a link 23. The links 21 and 23 can be session links, which are maintained during the session between the requesting entity 12 and the controlled resource 14. If the access authentication component 16 is also providing the access authorization/control to the controlled resource 14, in place of the access authorization/control 34, when the permission and business rules and information will be in the access authentication component 16, such as in the field 32.

Figure 4:
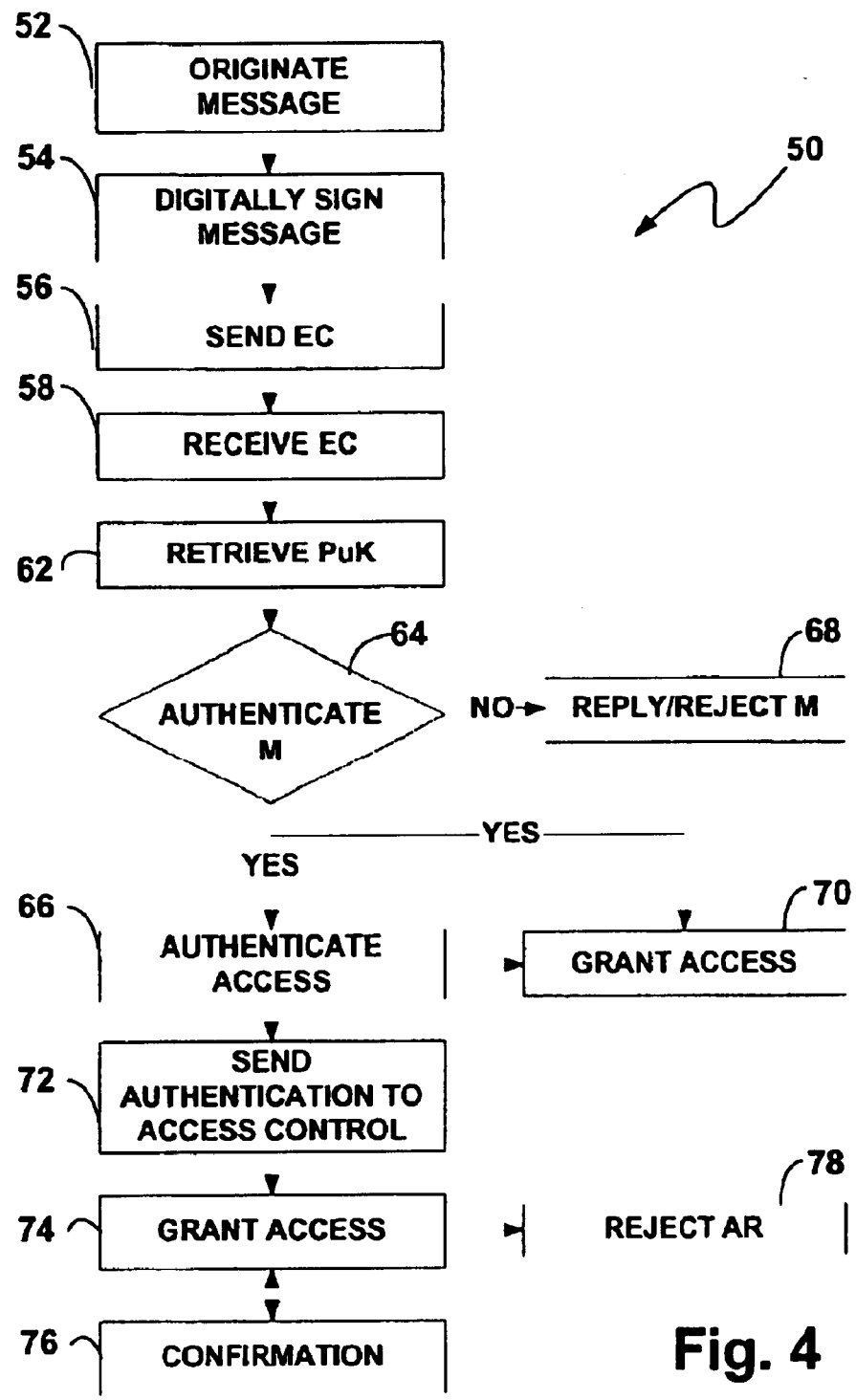
FIG. 4 illustrates a flow diagram of the operation of the first embodiment of the present invention.

Once the requesting entity 12 has initialized the security account with the account authority 11 and the access authentication component 16, then the requesting entity 12 can sent the authentication factor and/or an EC 18 to the access authentication component 16, to authenticate access to the controlled resource 14, as described with respect to the flow diagram in FIG. 4.

Referring now to FIG. 4, a flow diagram 60 of the operation of the access authentication system 50 is illustrated. The requesting entity 12, originates a M in step 52, which can just be the AcctID 30, which acts then as an implicit AR to the access authentication component 16. The requesting entity 12 then digitally signs the M in a step 54, using the PrK of the key pair. The Prk preferably is utilized in the device 22, which is utilized by the requesting entity 12 to digitally sign the M and then also to send the EC 18 in a step 56 over the medium 20 to the access authentication component 16. The access authentication component 16 receives the EC 18 in a step 58. The EC 18 includes the AcctID 30, so that the access authentication component 16 then can retrieve the correct associated PuK 28 in the record 24 in a step 62. The access authentication component 16 then uses the PuK 28 to authenticate the M in a step 64. The authentication of the M provides the possession authentication factor A of the requesting entity 12, authenticating "who they are" and authenticates access to the controlled resource 14 for the requesting entity 12 in a step 66. If the M does not authenticate, then the access authentication component 16 rejects the AR and can send the rejection to the requesting entity 12 in a step 68. The controlled resource 14 can accept the access authentication signal directly from the access authentication component 16 in the step 64 and directly grant access in a step 70 to the requesting entity 12. Where the controlled resource 14 includes its own access authorization/control 34, then the access authentication signal is sent to the access authorization/control 34 in a step 72. The access authorization/control 34 can be of many types and acts upon the access authentication signal in accordance with the permission profile and the business rules established therefor to grant access in a step 74 to the controlled resource 14. As before, the access authorization/control 34 can request a confirmation of the AR or a new/different authentication factor submission for a specific transaction as indicated by a step 76. The access authorization/control 34 can reject the AR in a step 78 if the confirmation, the risk elements or other rules are not satisfied. A specific physical space application of the system 50 is illustrated with respect to FIG. 5.

Figure 5:
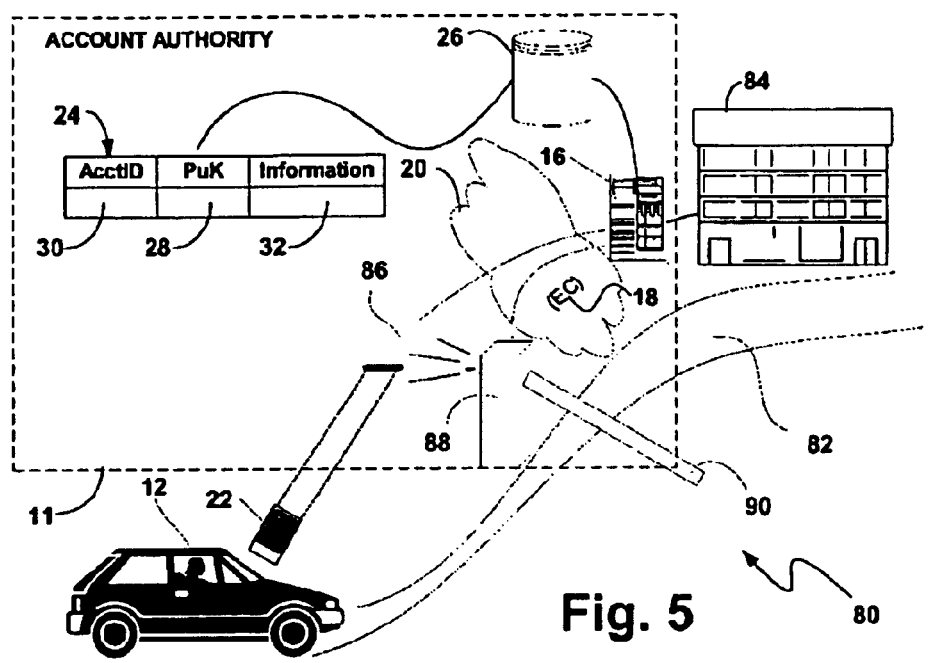
FIG. 5 illustrates a specific physical space application of the first account based embodiment of the present invention.

FIG. 5 illustrates a specific application or system 80 of the first single authentication factor embodiment 50 of the present invention. In the system 80, the device 22 is in the form of an access card, such as a smart card, security card or ID badge, to access a physical space 82, illustrated as a secure parking area or lot. In the system 80, the parking lot can be the controlled resource 14, which generally would be separate from the account authority 11, but associated therewith. The parking lot 82 provides parking for one or more buildings 84, which also could be the controlled resource 14, can be other controlled resources 14 or can just be accessible from the parking lot 82, without further security authentication being required.

The card 22 is configured to function in accordance with the single authentication factor A embodiment 50 of the present invention. The card 22 includes a suitable computer chip (not illustrated), such as described in detail in the incorporated by reference VS applications. The structure of the card 22 can be conventional and have the chip embedded therein, with structure for enabling communication with an I/O interface, here a card reader 86. The card 22 may include surface contacts (not illustrated) for enabling communication between the card 22 and the chip therein and the reader 86 by physical contact. The surface contacts preferably are ISO/IEC 7816 compliant. The card 22 may also be a proximity, preferably ISO/IEC 14443 compliant card and/or a card 22 capable of both proximity and surface communication operations.

In the first, single authentication factor system 80, the card 22 only requires the unique PuK-PrK key pair to authenticate "who the part 12 is". The record 24 in the database 26 will have the AcctID, such as an employee ID number, of the requesting entity 12 in the field 30, the PuK in the field 28 and information relating to the authentication factor of the party 12 in the field 32. If the system 80 is only authenticating the requesting entity 12, then the record 24 may only include the AcctID and/or the PuK. If, the system 80 is both authenticating and granting access, then the permission and other business rules will be included in the field 32, for example, that the requesting entity 12 is authorized access to the parking lot 82 and/or the building 84. The permission can be restricted to certain hours, such as 8 AM to 7 PM, on certain days, such as Monday through Friday or other hours on weekends or unrestricted access twenty-four hours each day. If only authentication is provided by the system 80, then the permission information and rules will be in the access authorization/control 34 (not illustrated in FIG. 5).

In operating the system 80, the requesting entity 12 presents the card 22 to the card reader 86 to gain access to the controlled resource 14, such as the parking lot 82 and/or building 84. The lot 82 is secured by a parking gate 88, which includes an arm 90, with the gate 88 being controlled by the access authentication component 16, providing both authentication and granting access in this example. The access authentication component 16 also is in communication with the card read 86, such as through the Internet 20, a local network or physically hard wires as a part of the gate 88. The card reader 86 is illustrated separate from the gate 88, but also could be physically installed within the structure of the gate 88, if desired.

When the card 22 is presented to the reader 86, by insertion in the card reader 86 or by being brought into proximity with the reader 86, as the case may be, the reader 86 is initialized in a conventional manner. Initialization generally is accomplished by the reader 86 detecting the card 22 upon presentation, or by the card 22 outputting a reset signal/message to the reader 86. The card 22 can operate to output the reset signal as part of the start-up protocol of the card 22 in the system 80, when the card 22 receives power from the reader 86.

Following initialization, the reader 86 may send a message input command to the card 22. The command requests that the AR be input by the card 22. Alternately, the card 22 may send the AR as part of the start-up protocol of the card 22 in the system 80. The AR can be a default message established for the system 80, such as simply the AcctID or PuK of the requesting entity 12. The card 22 digitally signs the AR with the PrK, adds the AcctID to the M and exports the resulting EC 18 to the reader 86. The reader 86 communicates the EC 18 to the access authentication 16, where the AcctID with the M is used to find the record 24 in the database 26 and retrieve the PuK and any relevant permission and other security information. The information may first be compared with the day and time that the card 22 is presented. If, the requesting entity 12 is permitted access at the that day and time, the PuK then is utilized by the access authentication component 16 to authenticate the M. If the M authenticates to provides the AcctID, then the requesting entity 12 is authenticated and the access authentication component 16 sends a message to grant access to the gate 88. Alternately, the M can be first authenticated and then the security information can be compared after the M is successfully authenticated. The gate 88 then raises the arm 90 to grant access to the requesting entity 12 to the lot 82 and/or the building 84.

The system 80 operates only upon when the requesting entity 12 possesses, here the card 22. As long as the card 22 has the correct AcctID and PrK then access is authenticated, whether or not the requesting entity 12 is the party who is the rightful possessor the card 22. If the AcctID does not match an AcctID in the database 26 or if the M does not authenticate, then the access authentication component 16 will send a rejection to the card 22 or alternately will just not open the gate arm 90. An internal security alarm could also be generated to be used by the system 80, as desired.

Figure 6:
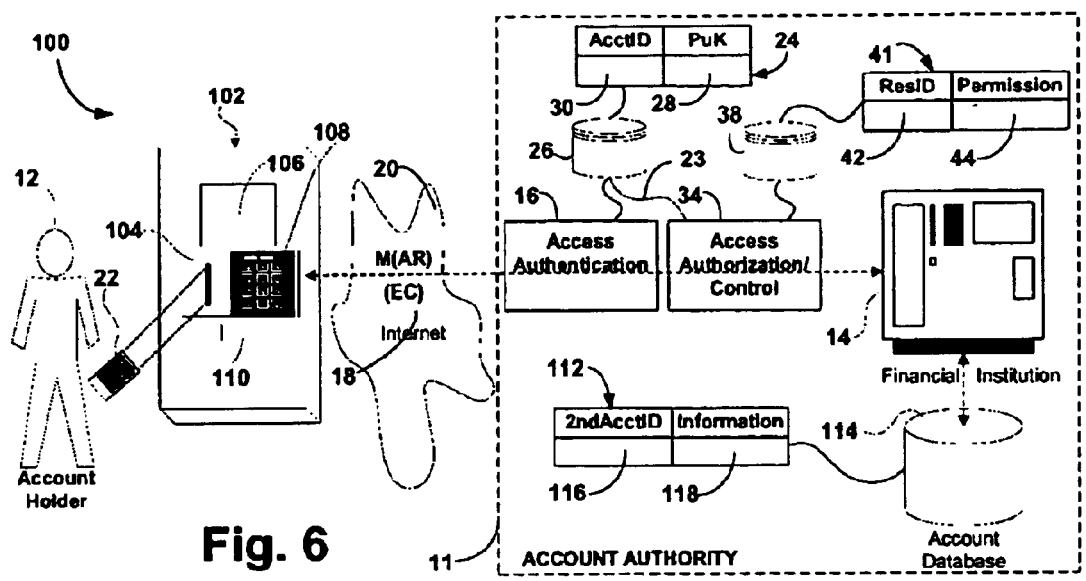
FIG. 6 illustrates a specific financial application of the first account based embodiment of the present invention.

FIG. 6 illustrates a specific financial application or system 10 of the first single authentication factor A embodiment 50 of the present invention. The account authority can include all the components of the system 100, with or without the I/O terminal. Functions which are the same or substantially the same as the system 80 are not repeated in detail, since they would be understood by one skilled in the art. The requesting entity 12 is an account holder in the controlled resource 14, here a financial institution computer. The account holder 12 has in their possession a device 22, here a card, such as an ATM card. The card 22 has the PuK-PrK therein and can be used at an ATM machine or the like I/O terminal 102. The machine 102 includes a card reader 104, a display 106, an alphanumeric keypad 108 and a cash dispenser 110. The requesting entity 12 and the card 22 are associated with an account record 112 maintained by the financial institution computer 14 in an account database 114. The party 12 has a second identifier, illustrated as a 2ndAcctID stored in a field 116 and related account information stored in a field 118. The 2ndAcctID may or may not be the same as the AcctID in the record 24. The account may be a checking account, savings account, money market or the like. The financial institution may be a bank, a credit union, an Internet bank or the like.

To initiate a transaction, the holder 12 inserts the card 22 into the card reader 104 of the machine 102. The machine 102 is initialized by the insertion of the card 22 and prompts the holder 12 to select a transaction using the display 106 and the holder 12 selects a displayed transaction, such as checking the account balance in the record 112. The machine 102 sends the account balance instruction to the card 22 where the instruction is digitally signed and returned with the AcctID as the EC 18 to the machine 102, which sends the EC 18 to the access authentication 16. The access authentication component 16 uses the AcctID to obtain the PuK from the record 24 and authenticates the M to authenticate access for the holder 12. The access authentication signal then is sent to the access authorization/control 34, which uses the ResID to obtain the account permission from the record 41. The permission is at least to access the account and obtain information regarding the account, such as the account balance. The access authorization/control 34 provides or grants access to the financial institution computer 14 if all other rules factors are satisfied. The institution computer 14 in turn executes the instruction and obtains the balance from the account record 112 and sends it for display on the display 106 of the machine 102. The institution computer 14 also may maintain its own permission profile and rules and will compare them to the authenticated AR, before executing the instruction. The access authorization/control 34 or the institution computer 14 can request a confirmation through the access authentication component 16 of the requested transaction and can access the database 26 during a session as before. The holder 12 can initiate other transactions in the same or different sessions in a similar manner.

Figure 7:
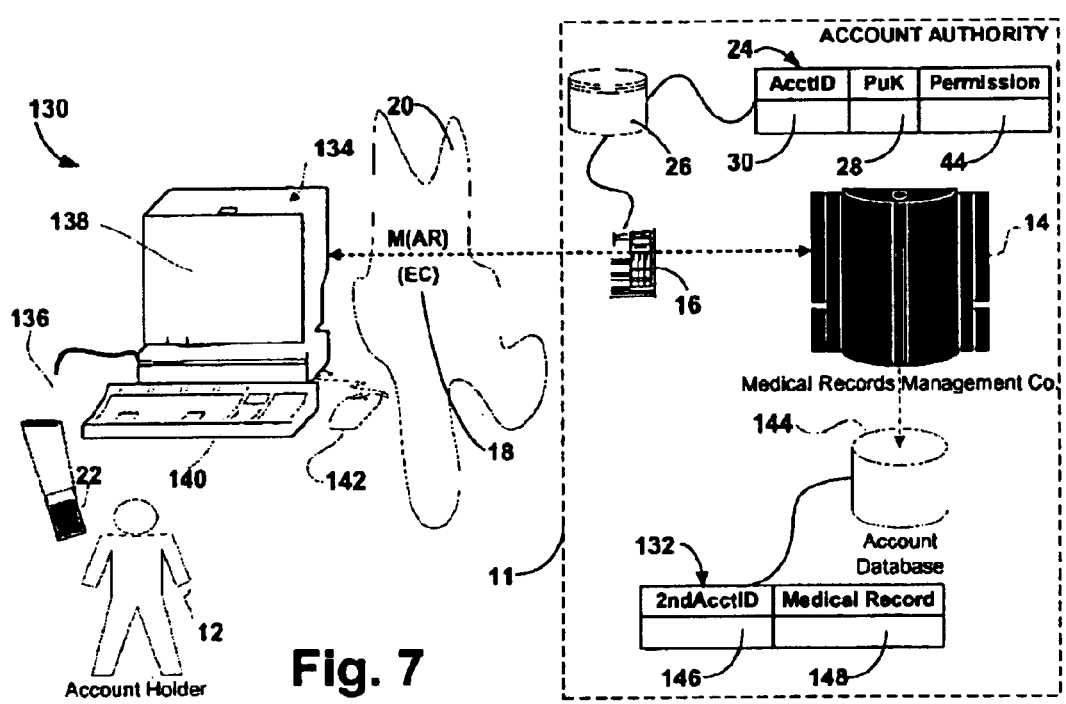
FIG. 7 illustrates a specific information application of the first account based embodiment of the present invention.

FIG. 7 illustrates a specific medical business record application or system 130 of the first single authentication factor A embodiment 50 of the present invention. Again, functions which are the same or substantially the same as the system 80 are not repeated in detail, since they would be understood by one skilled in the art. The requesting entity 12 is an account holder of a medical record 132 in the controlled resource 14, here a medical records management company computer. The account holder 12 has in their possession a device 22, here a card, such as a security card. The card 22 has the PuK-Prk therein and can be used at a personal computer (pc) or the like 134. The pc 134 includes a card reader 136 coupled thereto, a monitor 138, an alphanumeric keyboard 140 and a mouse 142. The account authority 11 generally would include all the components of the system 130 with or without the pc 134. The requesting entity 12 and the card 22 are associated with the medical account record 132 maintained by the medical records management company computer 14 in an account database 144. The requesting entity 12 has a 2ndAcctID stored in a field 146 and related medical information stored in a field 148 and also may include the permission profile and other related business rules relating to the requesting entity 12. The medical information may be patient data for a specific procedure or specific test results related to a particular doctor or hospital, or the like. The communication medium 20 here would most likely be a secure Intranet or other direct secure link between the pc 134 and the controlled resource 14, due to the sensitivity of the record 132 and similar records in the database 144.

To initiate a transaction, the holder 12 inserts the card 22 into the card reader 136 of the pc 134. The pc 134 then allows the holder 12 to select a transaction using the keyboard 140 and/or the mouse 142 and the holder 12 selects a desired transaction with the record 132, such as reviewing test results. The holder 12 then uses the pc 134 to send the instruction to the card 22 where the instruction is digitally signed and returned with the AcctID as the EC 18 to the pc 134. The holder 12 then can send the EC 18 to the access authentication 16, again using the keyboard 140 and/or mouse 142 in a conventional manner. The access information component 16 uses the AcctID to obtain the PuK from the record 24 and authenticates the M to authenticate access for the holder 12. In the system 130, the access authentication component 16 obtains the account permission from the field 44. The permission is at least to access the account record 132 and obtain information regarding the account, such as the test results stored in the field 148. The access authentication component 16 grants access to the management company computer 14, which in turn executes the instruction and obtains the test results from the account record 132 and sends the results for display on the monitor 138 of the pc 134. The management company computer 14 can require a confirmation for each request and review its own business rules and access profile as before. The holder 12 also can initiate other request transactions in the same or separate sessions in a similar manner.

Figure 8:
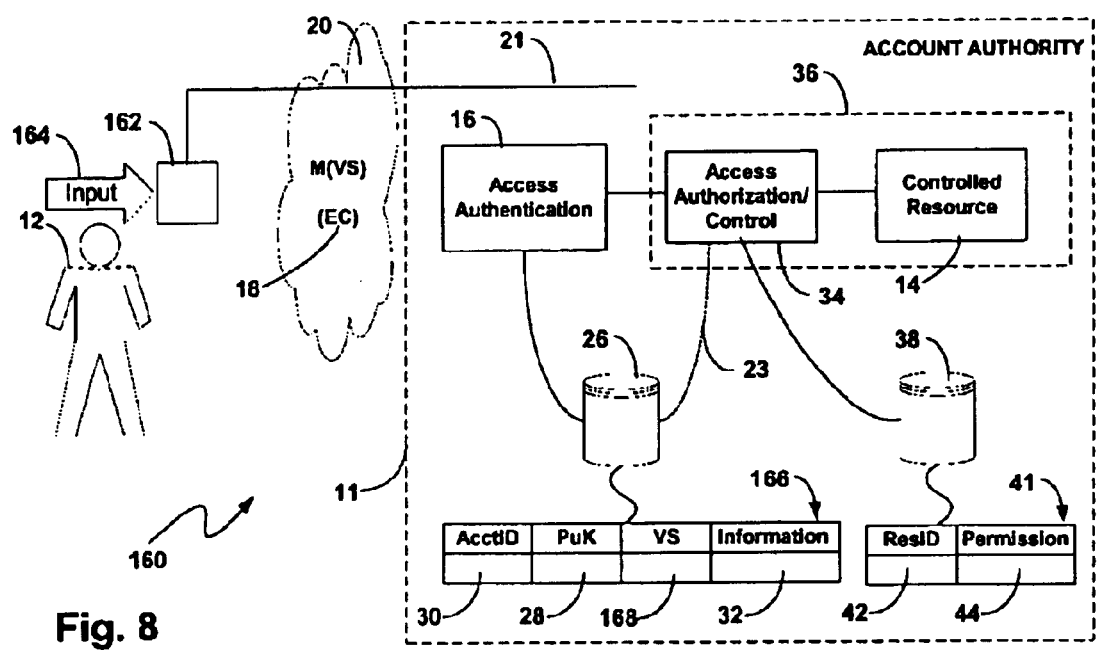
FIG. 8 illustrates a block diagram of a second verification based embodiment of the present invention.

Referring now to FIG. 8, a second verification based access authentication and authorization system embodiment of the present invention is designated generally by the reference numeral 160. The authentication factor B of the system 160 requires both possession of the PrK and knowledge of the Secrete confidential information, such as the PIN and/or presentation of biometric information factor C. Further the system 160 can include possession (the PrK), knowledge of the Secret information (PIN) and one or more biometric inputs or what the requesting entity 12 is. As previously referenced, the same elements use the same reference numerals. The account authority 11 generally may include all the components of the system 160. The access system 160 includes the requesting entity 12 who desires access to the controlled resource 14. The controlled resource 14, again, may be any restricted access resource, such as a physical space, an information repository or a financial institution, as will be described in further detail hereinafter. The controlled resource 14 has the access to it authenticated by the access authentication component 16 and the access authorization/control 34 grants access. The requesting entity 12 again sends an access request (AR) in the form of the EC 18 to the access authentication component 16 via the communication medium 20.

The EC 18 includes a message (M), such as just the AR. The requesting entity 12 using the PrK of the PuK-PrK key pair, which is held by the requesting entity 12, digitally signs the M. The PuK-Prk key pair preferably is contained with a secure device 162, which is kept by the requesting entity 12. The device 162 again contains the PuK-PrK key pair, can be used to digitally sign the M and preferably can export only the PuK. The device 162 additionally includes an input 164 from the requesting entity 12. The device 162 has verification data personal to the requesting entity 12 stored therein. The verification data can be one or more types of biometric data or a Secret security code, such as a PIN, or combinations thereof. The requesting entity 12 inputs the verification data into the device 162 and the device 162 attempts to match the verification data input with that stored in the device 162. The output of the comparison is a verification status or status indicator, such as a binary number, which can, for example be an indicator of: no verification data input in a specified time period (00), a match with the stored verification data without another indicator having been output since the match (01), a failed match of the input verification data (10) and a match with the input verification data with another indicator having been output since the match (11). The verification status can be sent in the EC 18 or can be directly sent to the access authentication component 16 to provide the authentication of "who thee requesting entity 12 is". Details of embodiments of the device 162, including the verification data and verification statuses and indicators, which can be utilized in the present invention, are described in detail in the VS applications incorporated by reference herein.

Again, before the M can be sent to the access authentication component 16, the requesting entity 12 opens the security account with the account authority and the access authentication components 16. The security account includes at least one record 166 related to the requesting entity 12. The security account and the record 166 preferably are established and maintained in the database 26 by the access authentication component 16, like the record 24. Details of embodiments of the database 26 and the operations thereof, which can be utilized in the present invention, are described in detail in the ABDS and VS applications incorporated by reference herein. The access authentication component 16 obtains the PuK of the requesting entity 12 and stores it in the record 166 in the PuK field 28. The access authentication component 16 associates the record 166 and therefore the PuK with a unique identifier or AcctID, stored in a field 30 in the record 166. The PuK again can be used for the AcctID, in which case the record 166 would only contain the field 28 and not the separate AcctID field 30. The record 166 also can include an information field 32, which is associated with the security account of the requesting entity 12 and can include various information relates to the requesting entity 12, included the permission profile. In addition the table of the verification status or more preferably, the verification status indicators can be stored in a field 168. Although indicated, for illustration purposes, as being stored in the record 166, the table of the verification statuses or more preferably, the verification status indicators most preferably is stored separately as a business rule in the access authentication component 16, since the table will be the same for all records.

As before stated, the controlled resource 14 generally will have its own access authorization/control 34, separate from the resource 14 or as a part thereof, as indicated by the block 36. The access authorization/control 34 will receive the access authentication signal from the access authentication component 16 and will grant access to the requesting entity 12, directly or through the access authentication component 16. Access is granted, for example by accessing the database 38. The database 38 includes at least one record 41. The record 41 includes a ResID in a field 42 and the associated permission profile in a field 44. The record 41 also can include risk elements and a set of business rules for the particular application, which can be the permitted level of access to the controlled resource 14 and/or other information regarding the account such as financial or business records to be accessed by the requesting entity 12. The controlled resource 14 or the access authorization/control 34 again can request confirmation of the authentication factors and any AR, such as via the links 21 and 23, as before. If the access authentication component 16 is also providing the access authorization/control to the controlled resource, in place of the access authorization/control 34, then the permission business rules and information will be located in the access authentication component 16, such as in the field 32, which then directly grants or rejects access for the entity 12.

Figure 9:
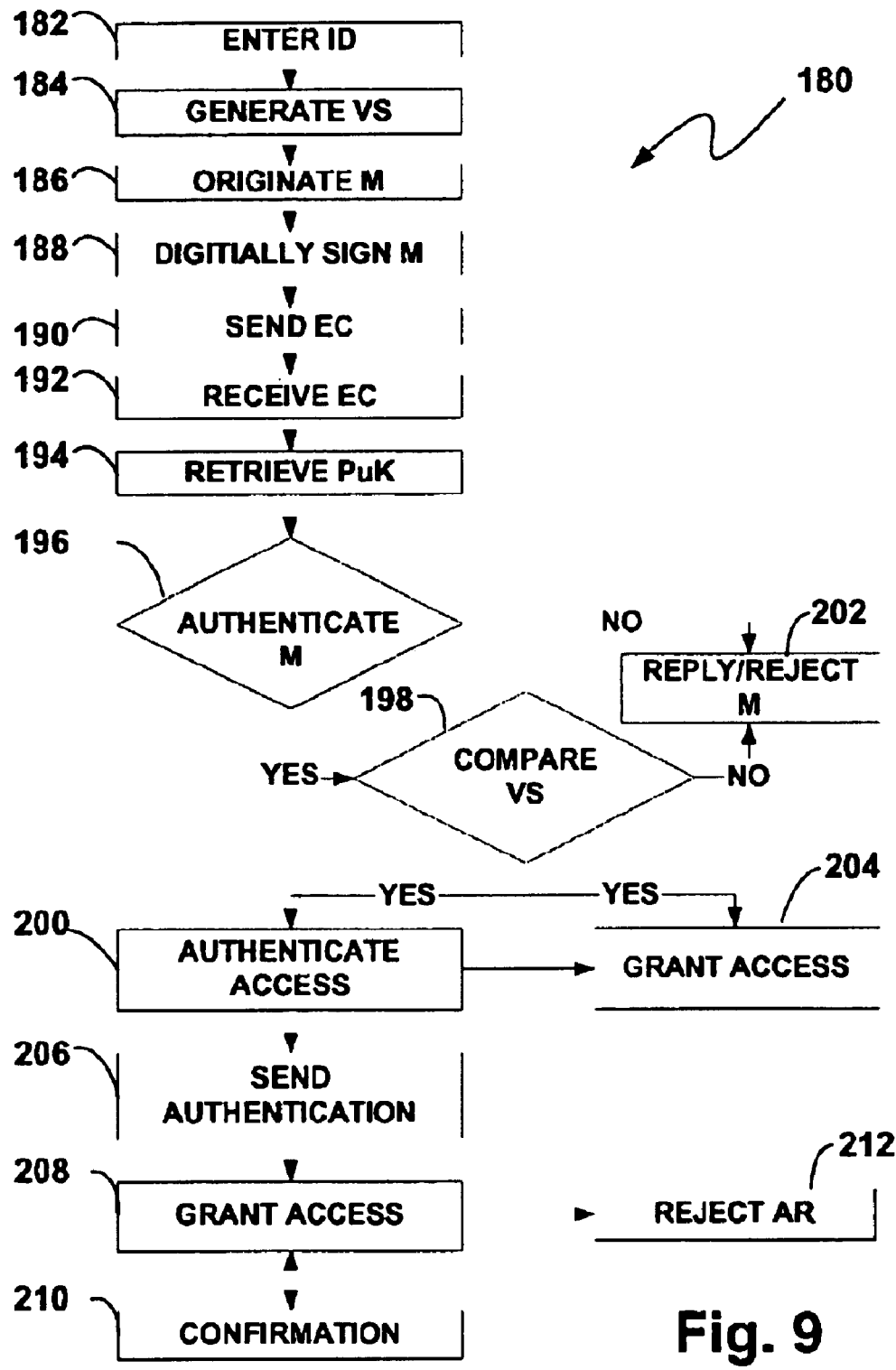
FIG. 9 illustrates a flow diagram of the operation of the second embodiment of the present invention.

Once the requesting entity 12 has initialized the security account with the account authority 11 and the access authentication component 16, then the requesting entity 12 can send an EC 18 to the access authentication component 16, to access the controlled resource 14, as described with respect to the flow diagram in FIG. 9.

Referring now to FIG. 9, a flow diagram 180 of the operation of the access system 160 is illustrated. The requesting entity 12 enters the verification data, such as the PIN, into the device input 164 in a step 182 and the device 162 generates a verification status in a step 184. The requesting entity 12 then originates a M in a step 186, which can just e the verification status indicator 168, which acts then as an implicit AR to the access authentication component 16. The requesting entity 12 then digitally signs the M in a step 188, using the PrK of the key pair. The PrK is utilized in the device 162, which is utilized by the requesting entity 12 to digitally sign the M and then also send the EC 18 in a step 190 over the medium 20 to the access authentication component 16. The access authentication component 16 receives the EC 18 in a step 192. The EC 18 includes the AcctID 30, so that the access authentication component 16 then can retrieve the correct associated PuK 28 in the record 166 in a step 194. The access authentication component 16 then uses the PuK 28 to the authenticate the M in a step 196. If the access authentication component 16 can successfully authenticate the M, then the access authentication component 16 attempts to authenticate the requesting entity 12 in a step 198, by comparing the verification status with the stored verification status indicators 168. If the verification status is a match (01), the verification status authenticates and then the access authentication component 16 authenticates access to the controlled resources 14 for the requesting entity 12 in a step 20-. As stated, the step 198 can include one or more verification statuses, such as a PIN and a fingerprint match. If the M does not authenticate in step 196 or fails to match an acceptable verification status indicator, such as by a failure to enter (00) or a failure to match (10) in the step 198, then the access authentication component 16 rejects the AR and can send the rejection to the requesting entity 12 in a step 202. The controlled resource 14 can accept the access authentication signal in a step 200 directly from the access authentication component 16 as granting access in a step 204, which directly grants access to the requesting entity 12. Where the controlled resource 14 includes its own access. authorization/control 34, then the access authentication signal is sent to the access authorization/control 34 in a step 206. As before, the access authorization/control 34 can be of many types and acts upon the access authentication signal in accordance with the permission profile, risk elements and business rules established to grant access in a step 208 to the controlled resource 14. Again, the access authorization/control 34 can request a confirmation of the AR or a new/different authentication factor submission for a transaction as indicated by step 210. Again, if the confirmation or other rules are not satisfied then the party can reject the AR in a step 212. A specific physical space application of the system 160 is illustrated with respect to FIG. 10.

Figure 10:
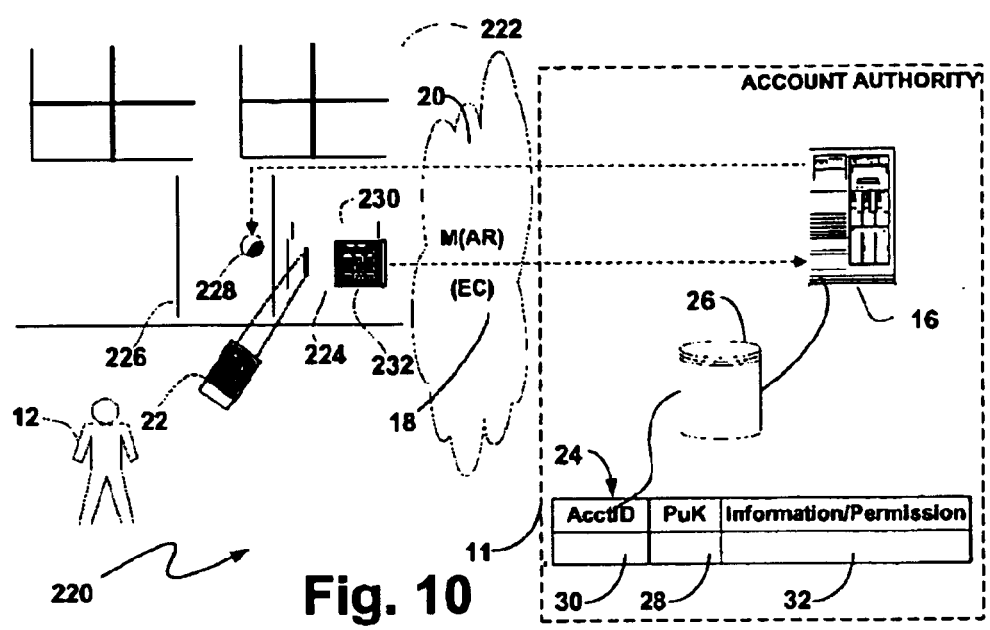
FIG. 10 illustrates a specific physical space application of the second verification based embodiment of the present invention.

FIG. 10 illustrates a specific physical space application or system 220 of the second verification based authentication factor embodiment 160 of the present invention. In the system 220, the device 22 is in the form of an access card, such as a smart card, security card or ID badge, to access a physical space 222, illustrated as a secure building. The account authority generally would include the components of the system 220, without the building 222. In the system 220, the building 222 can be the controlled resource 14. The building 222 includes a plurality of rooms (not illustrated), one or more of which also could be the controlled resource 14, can be other controlled resources 14 or can just be accessible in the building 222, without further security authentication being required.

The card 22 is configured to function in accordance with the verification based authentication factor embodiment 160 of the present invention. The card 22 includes a suitable computer chip (not illustrated), such as described in detail in the incorporated by reference VS applications. The structure of the card 22 again can be conventional and have the chip embedded therein, with structure for enabling communication with a card reader 224. The card 22 may include surface contacts (not illustrated) for enabling communication between the card 22 and the chip therein and the reader 224 by physical contact. The card 22 may also be a proximity compliant card and/or a card 22 capable of both proximity and surface communication operations.

In the verification based authentication factor system 220, the card 22 requires the unique PuK-PrK key pair and one or more types of verification data. The record 24 in the database 26 will have the AcctID, such as an employee ID number, of the requesting entity 12 in the field 30, the PuK in the field 28 and information relating to the authentication factor(s) of the party 12 in the field 32. If the system 220 is only authenticating the requesting entity 12, then the record 24 may only include the AcctID and/or the PuK. If, the system 220 is both authenticating and granting access, as illustrated in FIG. 10, then the permission information/rules also will be included, for example, that the requesting entity 12 is authorized access to the building 222. The permitted access can be restricted to certain hours, such as 8 AM to 7 PM, on certain days, such as Monday through Friday or other hours on weekends or can be unrestricted access twenty-four hours each day. If only authentication is provided by the system 220, then the permission information/rules will be in the access authorization/control 34 (not illustrated in FIG. 10).

In operating the system 220, the requesting entity 12 presents the card 22 to the card reader 224 to gain access to the controlled resource 14, such as the building 222. The building 222 is secured by a locked door 226, which includes a lock 228, with the lock 228 being controlled/actuated by the access authentication component 16, providing both authentication and granting access in this example. The access authentication component 16 also is in communication with the I/O structure, here a card reader 224, such as through the Internet 20, a local network or physically hard wired as a part of reader 224.

When the card 22 is presented to the reader 224, by insertion in the card reader 224 or by being brought into proximity with the reader 224, as the case may be, the reader 224 is initialized in a conventional manner. Initialization generally is accomplished by the reader 224 detecting the card 22 upon presentation, or by the card 22 outputting a reset signal/message to the reader 224. The card 22 can operate to output the reset signal as part of the start-up protocol of the card 22 in the system 220, when the card 22 receives power from the reader 224.

Following initialization, the reader 224 may display a message input request or prompt on a display 230. The prompt requests that the requesting entity 12 input the verification data, such as a Secret, here a PIN, using an alphanumeric keypad 232 connected to or communicating with the reader 224 and to the card 22. The card compares the PIN input with that stored therein and generates the verification status indicator. The card 22 then originates a M, which can be a default message established for the system 220, such as simply the verification status indicator. The card 22 digitally signs the message with the PrK to form the M, adds the ACCtID to the M and exports the resulting ED 18 to the reader 224. The reader 224 communicates the ED 18 to the access authentication 16, where the ACCtID with the M is used to find the record 24 in the database 26 and retrieve the PuK and any relevant security rules and permission information. The permission profile or information may first be compared with the day and time that the card 22 is presented. If, the requesting entity 12 is authorized access at that day and time, the PuK then is utilized by the access authentication component 16 to authenticate the M. If the M authenticates to provide the verification status indicator, which can be compared to the verification status indicator table in the access authentication component 16, then the requesting entity 12 is authenticated and if all other rules are satisfied, then the access authentication component 16 sends a grant access message to the door lock 228. Alternately, the M can be first authenticated and then the access information can be compared after the M is successfully authenticated. The lock 228 then is actuated to unlock the door 226 to provide access to the requesting entity 12 to the building 222. The AR can be an implicit instruction, since the only action is to open the door.

The system 220 operates upon both what the requesting entity 12 possesses, here the card 22 and what the requesting entity 12 knows, here the PIN to authenticate "who the part 12 is". As long as the card 22 has the correct AcctID, PrK and the correct PIN is input by the requesting entity 12, and the permission and other rules and risk elements are satisfied, then access is granted, whether or not the requesting entity 12 is the party who is the rightful possessor of the card 22. If the AcctID does not match an AcctID in the database 26, if the M does not authenticate, if one or more other rules or the permission is not satisfied or if the PIN is incorrect or not entered, then the access authentication component 16 will send a rejection to the card 22 or alternatively will just not open the door 226. An internal security alarm could also be generated to be used by the system 220, as desired.

Figure 11:
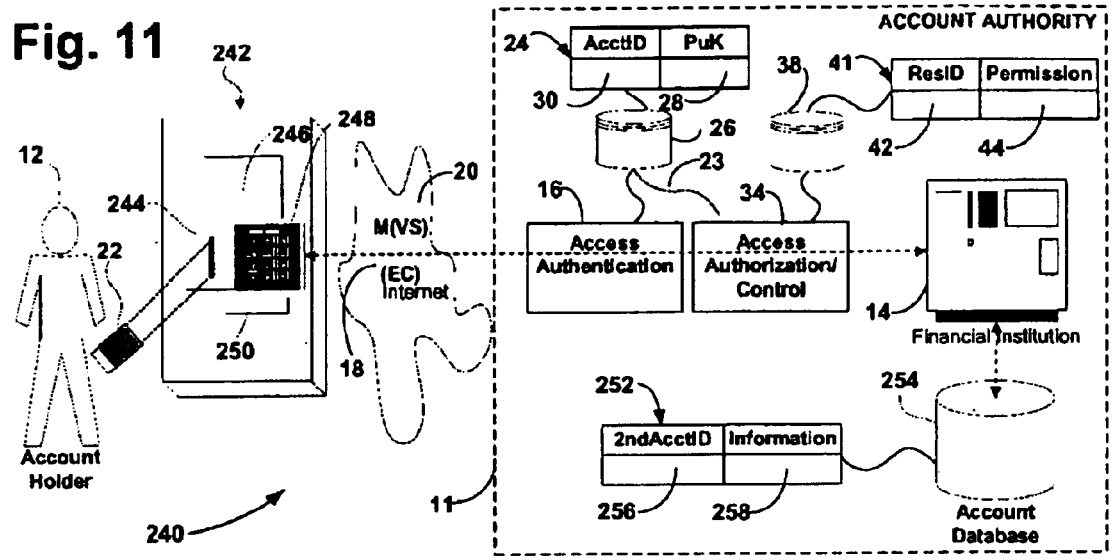
FIG. 11 illustrates a specific financial application of the second verification based embodiment of the present invention.

FIG. 11 illustrates a specific financial application of system 240 of the verification based authentication factor embodiment 160 of the present invention. Functions which are the same or substantially the same as the system 220 are not repeated in detail, since they would be understood by one skilled in the art. Again, all the components of the system 240 may be included within the account authority 11, except for the I/O terminal. The requesting entity 12 is an account holder in the controlled resource 14, here a financial institution computer. The account holder 12 has in their possession a device 22, here a card, such as an ATM card. The card 22 has the verification data and the PuK-PrK therein and can be used at an ATM machine or the like 242. The machine 242 includes an I/O card reader 244, a display 246, an alphanumeric keypad 248 and a cash dispenser 250. The requesting entity 12 and the card 22 are associated with an account record 252 maintained by the financial institution computer 14 in an account database 254. The party 12 has a 2ndAcctID stored in a field 256 and related account information stored in a field 258. The account may be a checking account, savings account, money market or the like. The financial institution may be a bank, a credit union, an Internet bank or the like.

To initiate a transaction, the holder 12 inserts the card 22 into the card reader 244 of the machine 242. The machine 242 is initialized by the insertion of the card 22 and prompts the holder 12 to select a transaction using the display 246 and the holder 12 selects a displayed transaction (AR) using the keyboard 248, such as a cash withdrawal. The holder 12 also enters the Secret, a PIN, using the keyboard 248. The machine 242 then sends the cash withdrawal instruction to the card 22, where the instruction is digitally signed and returned with the AcctID and/or verification status indicator as the EC 18 to the machine 242, which sends the EC 18 to the access authentication component 16. The access authentication component 16 uses the AcctID to obtain the PuK from the record 24 and authenticates the M and compares the verification status to the stored table of verification status indicators to authenticate access for the holder 12. The access authentication signal then is sent to the access authorization/control 34, which uses the ResID to obtain the account permission profile and other business rules and risk elements from the record 41, or directly from the financial institution computer 14. The permission is at least to access the account, withdraw cash and generally to obtain information regarding the account, such as the resulting account balance. The access authorization/control 34 grants access to the financial institution computer 14, which in turn executes the instruction, compares the balance available from the account record 252 and if sufficient sends an instruction to the machine 242 to dispense the cash and to display the balance on the display 246 of the machine 242. The access authorization/control 34 or the institution computer 14 can request a confirmation through the access authentication component 16 of the requested transaction and can access the database 26 during a session as before. The holder 12 can initiate other transactions in the same or different sessions in a similar manner.

Figure 12:
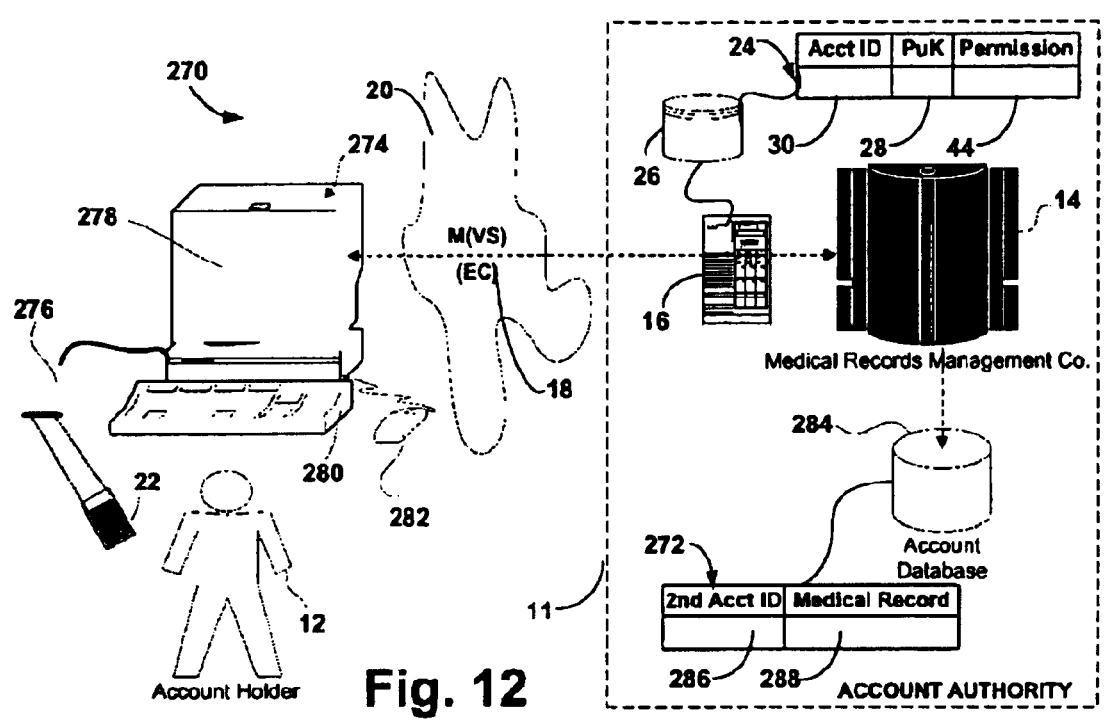
FIG. 12 illustrates a specific information application of the second verification based embodiment of the present invention.

FIG. 12 illustrates a specific medical business record application or system 270 of the verification based authentication factor embodiment 160 of the present invention. Again, functions which are the same or substantially the same as the system 220 are not repeated in detail, since they would be understood by one skilled in the art. The requesting entity 12 is an account holder of a medical record 272 in the controlled resource 14, here a medical records management company computer. The account holder 12 has in their possession a device 22, here a card, such as a security card. The card 22 has the PuK-PrK and verification status data therein and can be used at a personal computer (pc) or the like 274. The pc 274 includes an I/O card reader 276 coupled thereto, a monitor 278, an alphanumeric keyboard 280 and a mouse 282. The account authority 11 includes all of the components of the system 270, including the pc 274, where the medium is a secure Intranet. The requesting entity 12 and the card 22 are associated with the medical account record 272 maintained by the medical records management company computer 14 in an account database 284. The party 12 has a 2ndAcctID stored in a field 286 and related medical information stored in a field 288. The medical information may be patient data for a specific procedure or specific test results related to a particular doctor or hospital, the medical history of the patient, or the like. As before, the communication medium 20 here would most likely be a secure intranet or other direct secure link between the pc 274 and the controlled resource 14, due to the sensitivity of the record 272 and other records in the database 284.

To initiate a transaction, such as reviewing the medical history, the holder 12 inserts the card 22 into the card reader 276 of the pc 274. The pc 274 then allows the holder 12 to select a transaction using the keyboard 280 and/or the mouse 282 and the holder 12 selects a desired transaction with the record 272, such as reviewing the medical history. The holder 12 then uses the pc 274 to send the instruction and the PIN to the card 22 when the verification status data is compared to the PIN entered and a verification status indicator is generated. The instruction, such as the verification status indicator, then is digitally signed and returned with the AcctID as the EC 18 to the pc 274. The holder 12 then can send the EC 18 to the access authentication component 16, again using the keyboard 280 and/or mouse 282 in a conventional manner. The access authentication component 16 uses the AcctID to obtain the PuK from the record 24 and authenticates the M and compares the verification status indicator with the verification status indicator table to authenticate access for the holder 12. In the system 270, the access authentication component 16 also obtains the account permission profile and other rules from the record field 44. The permission is at least to access the account record 272 and obtain information regarding the account, such as the medical history stored in the field 288. If the permission and other rules are satisfied, then the access authentication component 16 grants access to the management company computer 14, which in turn executes the instruction and obtains the medical history from the account record 272 and sends the results for display on the monitor 278 of the pc 274. The rules or the management company computer 14 can require a confirmation for some or all of the requests in a session as before. The holder 12 also can initiate other request transactions in the same or separate sessions in a similar manner.

Figure 13:
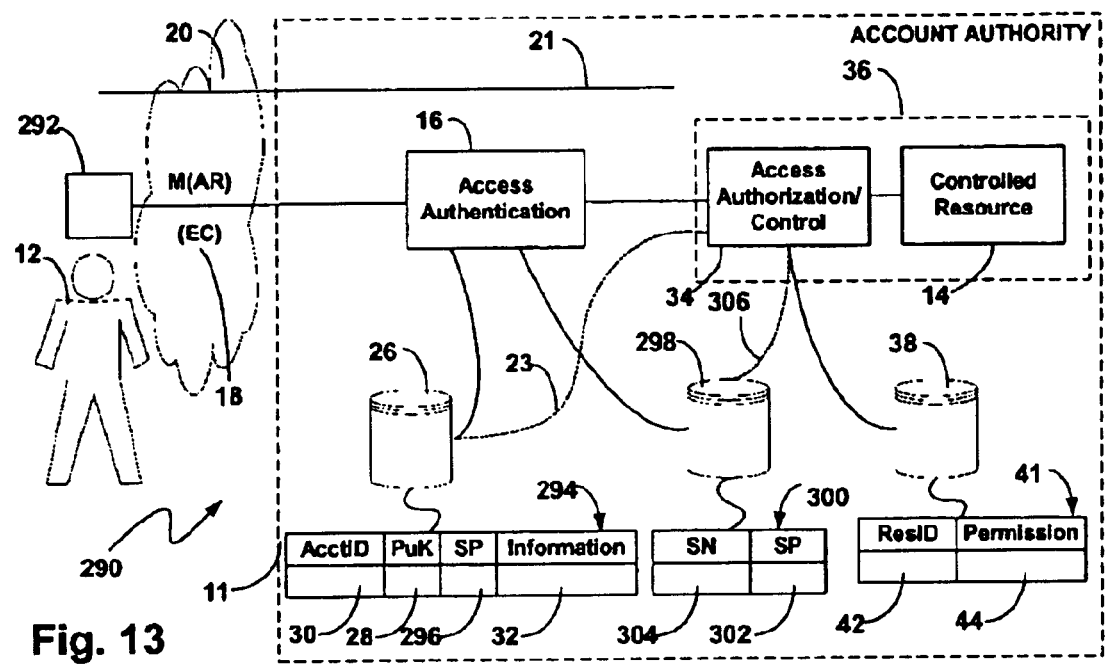
FIG. 13 illustrates a block diagram of a third security profile based embodiment of the present invention.

Referring now to FIG. 13, a third security profile based access authentication system embodiment of the present invention is designated generally by the reference numeral 290. The authentication system 290 includes the requesting entity 12 who desires access to the controlled resource 14.

The controlled resource 14, again, may be any restricted access entity, such as a physical space, an information repository or a financial institution. The controlled resource 14 has the access to it controlled by the access authentication component 16. The requesting entity 12 again sends an access request (AR) in the form of the EC 18 to the access authentication component 16 via the communication medium 20.

The EC 18 includes a message (M), such as just the AR. The requesting entity 12 digitally signs the M, using the PrK of the PuK-PrK key pair held by the requesting entity 12. The PuK-PrK key pair is contained within a secure device 292, which is kept by the requesting entity 12. The device 292 again contains the PuK-PrK key pair, can be used to digitally sign the M and preferably can export only the PuK. The device 292 additionally is associated with a security profile, which generally is not but optionally could be stored or otherwise contained in the device 292. If the security profile is stored in the device 292, it then can be used as or with a M by the device 292. The security profile can include security characteristics, authentication capabilities (such as a PIN or biometric data) and the manufacturing history of the device 292. Details of embodiments of the device 292, including the security profile, which can be utilized in the present invention, are described in detail in the PRiMR applications incorporated by reference herein.

Again, before the M can be sent to the access authentication component 16, the requesting entity 12 opens the security account with the account authority 11 and the access authentication component 16. The security account includes at least one record 294 related to the requesting entity 12. The security account and the record 294 preferably are established and maintained in the database 26 by the access authentication component 16, like the record 24. The access authentication component 16 obtains the PuK of the requesting entity 12 and stores it in the record 294 in the PuK field 28. The access authentication component 16 associates the record 294 and therefor the PuK with a unique identifier or AcctID, stored in the field 30 in the record 294. The record 294 also includes an Information field 32, which is associated with the security account of the requesting entity 12 and can include various information related to the requesting entity 12. The information can be the permission profile, permitted level of access and/or other information regarding the security account such as financial or records to be accessed by the requesting entity 12. In addition, the security profile (SP) of the device 292 optionally can be stored in the record 294 in a field 296, with appropriate security for accessing the profile.

Again, the controlled resource 14 generally will have its own access authorization/control 34. The access authorization/control 34 will receive the access authentication signal from the access authentication component 16 and will, if the permission and other rules and risk elements are satisfied, grant access to the requesting entity 12, directly or through the access authentication component 16. Access is granted, for example by accessing the database 38. The database 38 includes at least one record 41, including a ResID in the field 42 and the associated permission and other rules in the field 44. The permission profile for the particular application can be the permitted level of access to the controlled resource 14 and/or other information regarding the account such as financial or business records to be accessed by the requesting entity 12. The controlled resource 14 or the access authorization/control 34 again can request confirmation of the access authentication signal and/or the instruction for any AR, such as via the links 21 and 23, as before. The access authorization/control 34 also will have access to the database 298 via a link 306. If the access authentication component 16 is also providing the access authorization/control to the controlled resource 14, in place of the access authorization/control 34, then the permission business rules and information will be located in the access authentication component 16, such as in the field 32 and it will directly grant access if all required conditions are met.

Figure 14:
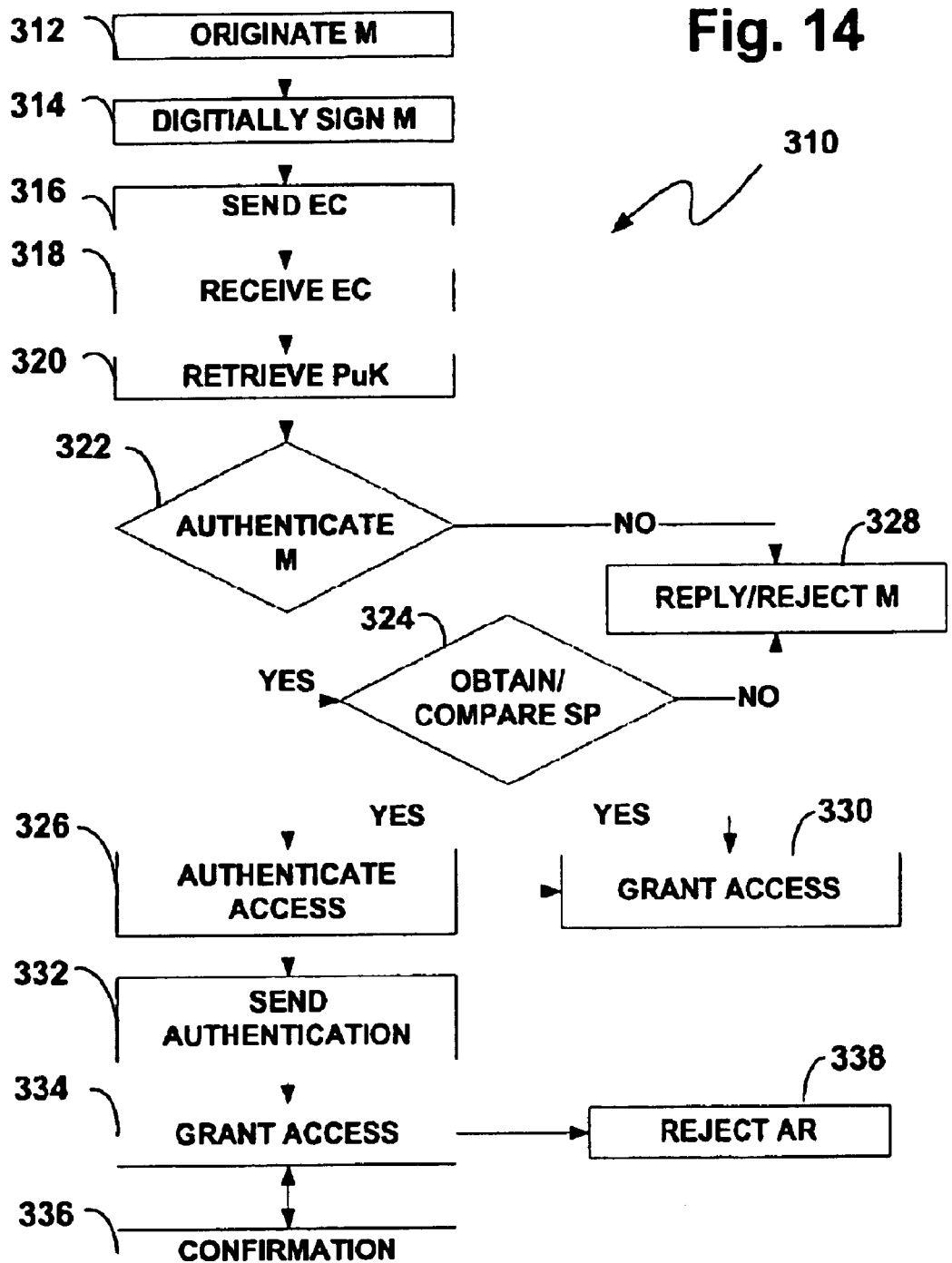
FIG. 14 illustrates a flow diagram of the operation of the third embodiment of the present invention.

Once the requesting entity 12 has initialized the security account with the account authority 11 and the access authentication component 16, then the requesting entity 12 can send an EC 18 to the access authentication component 16, to access the controlled resource 14, as described with respect to the flow diagram in FIG. 14.

Although the security profile can be stored in the database 26, in the record 294, the security profile preferably will be stored in a separate secure database 298. The secure database 298 can be maintained by the facility (not illustrated), in which the device 292 was manufactured. The access authentication component 16 can access the database 298, like the database 26 and access a record 300 which includes the security profile of the device 292 in a field 302. The device 292 can be located by a serial number or other identifier, such as the PuK, located in a field 304. Details of embodiments of the database 298, including the security profile, which can be utilized in the present invention, are described in detail in the PRiMR applications incorporated by reference herein.

Referring now to FIG. 14, a flow diagram 310 of the operation of the authentication system 290 is illustrated. The requesting entity 12 originates a M in a step 312, which can just be the security profile 296 or 302, which acts then as an implicit AR to the access authentication component 16. The requesting entity 12 then digitally signs the M in a step 314, using the PrK of the key pair. The PrK is utilized in the device 292, which is utilized by the requesting entity 12 to digitally sign the M and then also send the EC 18 in a step 316 over the medium 20 to the access authentication component 16. The access authentication component 16 receives the EC 18 in a step 318. The EC 18 includes the AcctID 30, so that the access authentication component 16 then can retrieve the correct associated PuK 28 in the record 294 in a step 320. The access authentication component 16 then uses the PuK 28 to authenticate the M in a step 322. If the access authentication component 16 can successfully authenticate the M, then the access authentication component 16 attempts to authenticate the requesting entity 12 in a step 324, by comparing the security profile, if included with the M, with the stored security profile 296 or 302. If the security profile is a match and meets the access risk requirements then the AR is authenticated. Whether the security profile is sent or stored, the access authentication component 16 reviews the profile to determine whether it should accept the card 22 in the requested transaction and authenticate access to the controlled resource 14 for the requesting entity 12 in a step 326. If the M does not authenticate in the step 322 or fails to match the security profile or the access authentication component 16 decides not to accept the risk associated with the security profile of the card 22 in the step 324, then the access authentication component 16 rejects the AR and can send the rejection to the requesting entity 12 in a step 328. The controlled resource 14 can accept the access authentication signal directly from the access authentication component 16 in a step 326 to grant access in a step 330 to the requesting entity 12. Where the controlled resource 14 includes its own access authorization/control 34, then the access authentication signal is sent to the access authorization/control 34 in a step 332. As before, the access authorization/control 34 can be of many types and acts upon the authentication in a known conventional manner in accordance with the business rules established to grant access in a step 334 to the controlled resource 14. The access authorization/control 34 or the controlled resource 14, again can request a confirmation of the AR or a new/different authentication factor submission as indicated by step 336. If the confirmation or other rules or permission are not satisfied, then the AR is rejected in a step 338. A specific physical space access application of the system 290 is illustrated with respect to FIG. 15.

Figure 15:
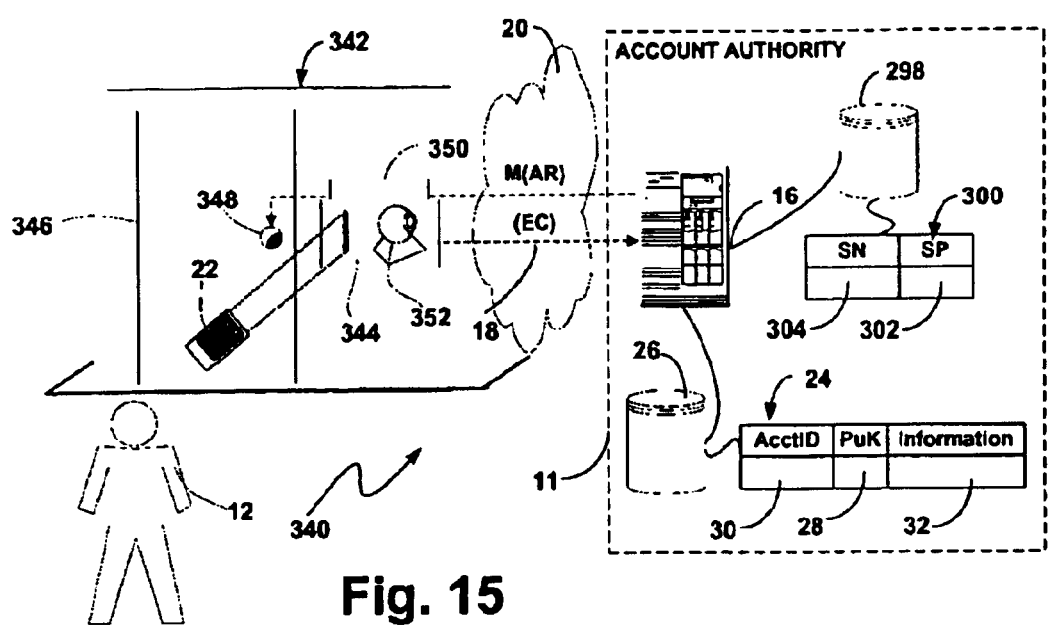
FIG. 15 illustrates a specific physical space application of the third security profile based embodiment of the present invention.

FIG. 15 illustrates a specific physical space application or system 340 of the security profile based authentication factor embodiment 290 of the present invention. In the system 340, the device 22 is in the form of an access card, such as a smart card, security card or ID badge, to access a physical space 342, illustrated as a secure room. The account authority 11 can include all the components of the system 340, generally not including the room 342. In the system 340, the room 342 can be the controlled resource 14. The room 342 can be an entrance to a plurality of rooms (not illustrated), one or more of which also could be the controlled resource 14, can be other controlled resources 14 or can just be accessible through the room 342, without further security authentication being required.

The card 22 is configured to function in accordance with the security profile based authentication factor embodiment 290 of the present invention. The card 22 includes a suitable computer chip (not illustrated), such as described in detail in the incorporated by reference VS applications. The structure of the card 22 again can be conventional and have the chip embedded therein, with structure for enabling communication with an I/O card reader 344. The card 22 may include surface contacts (not illustrated) for enabling communication between the card 22 and the chip therein and the reader 344 by physical contact. The card 22 may also be a proximity compliant card and/or card 22 capable of both proximity and surface communication operations.

In the security profile based authentication factor system 340, the card 22 requires the unique PuK-PrK key pair and may include one or more types of verification data. The record 24 in the database 26 will have the AcctID, such as an employee ID number, of the requesting entity 12 in the field 30, the PuK in the field 28 and information relating to the authentication factor of the party 12 in the field 32. If the system 340 is only authenticating the requesting entity 12, then the record 24 may only include the AcctID and/or the PuK. If, the system 340 is both authenticating and authorizing access, as illustrated in FIG. 15, then the permission information and other rules also will be included, for example, that the requesting entity 12 is authorized access to the room 342. The permitted access can be restricted to certain hours, such as 8 AM to 7 PM, on certain days, such as Monday through Friday or other hours on weekends or can be unrestricted access twenty-four hours each day. If only authentication is provided by the system 340, then the permission information and rules will be in the access authorization/control 34 (not illustrated in FIG. 15).

In operating the system 340, the requesting entity 12 presents the card 22 to the card reader 344 to gain access to the controlled resource 14, such as the room 342. The room 342 is secured by a locked door 346, which includes a lock 348, with the lock 348 being controlled/actuated by the access authentication component 16, providing both authentication and access grant in this example. The access authentication component 16 also is in communication with the card reader 344, such as through the Internet 20, a local network or physically hard wired as a part of the reader 344.

When the card 22 is presented to the reader 344, by insertion in the card reader 344 or by being brought into proximity with the reader 344, as the case may be, the reader 344 is initialized in a conventional manner. Initialization generally is accomplished by the reader 344 detecting the card 22 upon presentation, or by the card 22 outputting a reset signal/message to the reader 344. The card 22 can operate to output the reset signal as part of the start-up protocol of the card 22 in the system 340, when the card 22 receives power from the reader 344.

Following initialization, the reader 344 may display a message input request or prompt on a display 350. The prompt requests that the requesting entity 12 input the verification data, such as a PIN using an alphanumeric keypad (not illustrated in FIG. 13) or biometric data. The biometric data can be input or presented by scanning the requesting entity 12 retina with a scanning device 352 connected to or communicating with the reader 344 and to the card 22. The 22 card compares the biometric input with that stored therein and generates the verification status indicator. The card 22 then originates a M, which can be a default message established for the system 340, such as simply the verification status indicator or the AcctID. The card 22 digitally signs the message with the PrK to form the M, adds the AcctID to the M and exports the resulting EC 18 to the reader 344. The reader 344 communicates the EC 18 to the access authentication component 16, where the AcctID with the M is used to find the record 24 in the database 26 and retrieve the PuK and any relevant security and permission information. The information may first be compared with the day and time that the card 22 is presented. If, the requesting entity 12 is permitted access at that day and time, the PuK then is utilized by the access authentication component 16 to authenticate the M. If the M authenticates to provide the AcctID or verification status indicator, which can be compared to the verification status indicator table in the access authentication component 16, then the access authentication component 16 can obtain and compare the security profile from the field 302 of the record 300. If the security profile is sufficiently reliable for the requested access, then the requesting entity 12 is authenticated and if all other rules are satisfied, the access authentication component 16 sends a grant access message to the door lock 348. Alternately, the M can be first authenticated and then the access information can be compared after the M is successfully authenticated. The lock 348 then is actuated to unlock the door 346 to provide access to the requesting entity 12 to the room 342.

The system 340 operates upon both what the requesting entity 12 possesses, here the card 22 and the reliability of the card determined from the security profile of the card 22. The system further can include what the requesting entity 12 is, here represented by the retina scan biometric input. Without the biometric input, as long as the card 22 has the correct AcctID, PrK and an acceptable security profile, meets the other permission, risk and business rules, then access is granted, whether or not the requesting entity 12 is the party who is the rightful possessor of the card 22. If the AcctID does not match an AcctID in the database 26, if the M does not authenticate, if permission or a business rule is not satisfied or if the security profile is not acceptable, then the access authentication component 16 will send a rejection to the card 22 or alternately will just not open the door 346. An internal security alarm could also be generated for use by the system 340, as desired.

Figure 16:
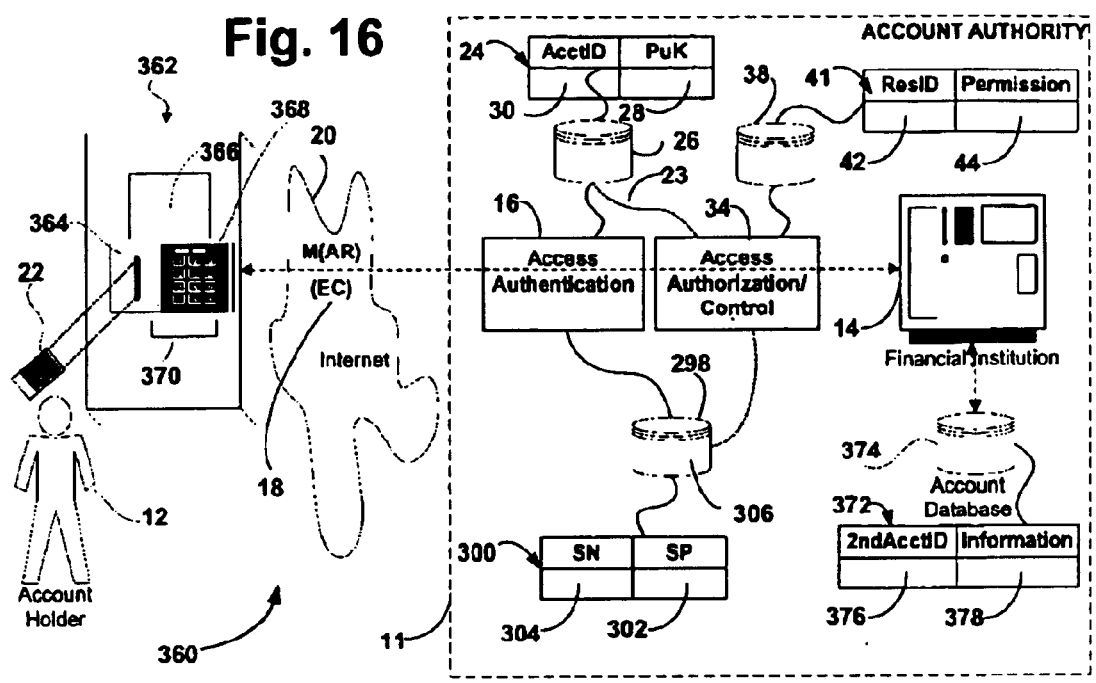
FIG. 16 illustrates a specific financial application of the third security profile based embodiment of the present invention.

FIG. 16 illustrates a specific financial application or system 360 of the security profile based authentication factor embodiment 290 of the present invention. Functions which are the same or substantially the same as the system 340 are not repeated in detail, since they would be understood by one skilled in the art. The requesting entity 12 is an account holder in the controlled resource 14, here a financial institution computer. The account holder 12 has in their possession a device 22, here a card, such as an ATM card. The card 22 at least has the PuK-PrK therein and can be used at an ATM machine or the like 362. The machine 362 includes an I/O card reader 364, a display 366, an alphanumeric keypad 368 and a cash dispenser 370. The account authority 11 may include all the components of the system 360, with or without the ATM machine 362. The requesting entity 12 and the card 22 are associated with an account record 372 maintained by the financial institution computer 14 in an account database 374. The party 12 has a 2ndAcctID stored in a field 376 and related account information stored in a field 378, which also can contain the permission profile of the party 12. The account may be a checking account, savings account, money market or the like. The financial institution may be a bank, a credit union, an Internet bank or the like.

To initiate a transaction, the holder 12 inserts the card 22 into the card reader 364 of the machine 362. The machine 362 is initialized by the insertion of the card 22 and prompts the holder 12 to select a transaction using the display 366 and the holder 12 selects a displayed transaction using the keyboard 368, such as a balance transfer. The holder 12 also may enter the PIN using the keyboard 368. The machine 362 then sends the balance transfer instruction to the card 22, where the PIN is compared, if entered and the instruction is digitally signed and returned with the AcctID and/or the verification status indicator as the EC 18 to the machine 362. The machine 362 sends the EC 18 to the access authentication 16. The access authentication component 16 uses the AcctID to obtain the PuK from the record 24 and authenticates the M and compares the verification status, if included, to the stored table of verification status indicators to authenticate access for the holder 12. The access authentication component 16 can retrieve the security profile 302 from the record 300 to determine if the card 22 is reliable for the requested transaction. If the card 22 is sufficiently reliable, then the access authentication signal is sent to the access authorization/control 34, which uses the ResID to obtain the account permission and any other rules from the record 41. The permission is at least to access the account and transact the balance transfer and generally to obtain information regarding the account, such as the resulting account balance. The access authorization/control 34, if all required conditions are met, grants access to the financial institution computer 14, which in turn executes the instruction, transfers the balance requested, if sufficient funds are available in the account record 372 and sends an instruction to the machine 362 to display the transfer and balance information on the display 366 of the machine 362. The access authorization/control 34 or the institution computer 14 can request a confirmation through the access authentication component 16 of the requested transaction and can access the databases 26 and 298 during a session as before. The holder 12 can initiate other transactions in the same or different sessions in a similar manner.

Figure 17:
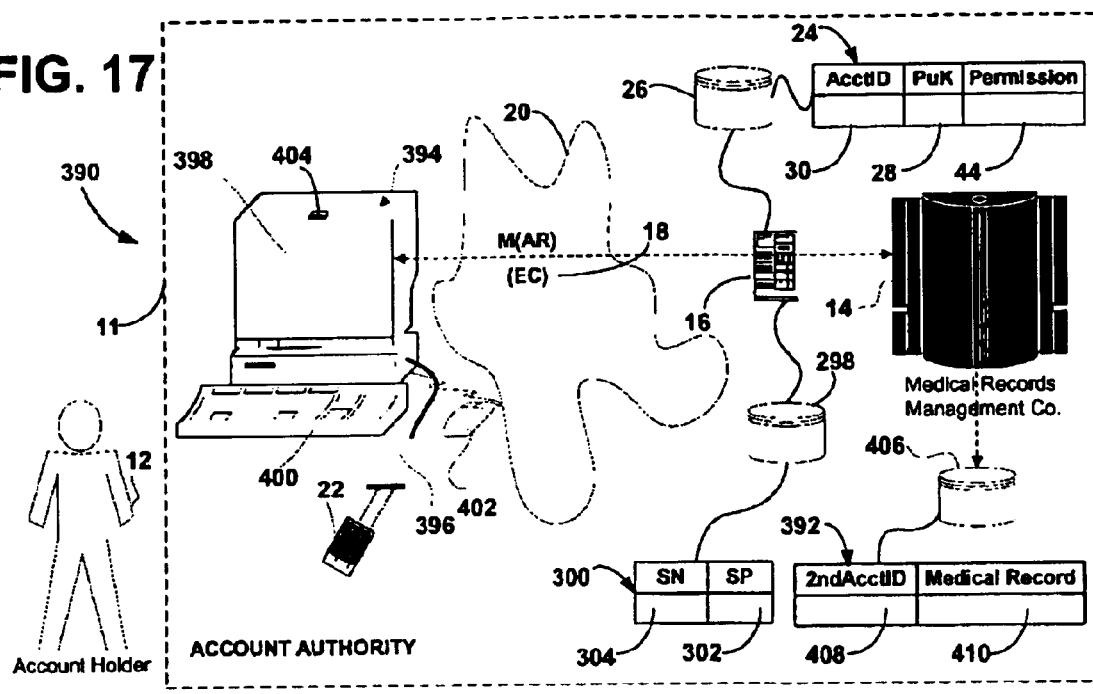
FIG. 17 illustrates a specific information application of the third security profile based embodiment of the present invention.

FIG. 17 illustrates a specific medical business record application or system 390 of the security profile based authentication factor embodiment 290 of the present invention. Again, functions which are the same or substantially the same as the system 340 are not repeated in detail, since they would be understood by one skilled in the art. The account authority 11 here may include all the components of the system 390, as illustrated. The requesting entity 12 is an account holder of a medical record 392 in the controlled resource 14, here a medical records management company. The account holder 12 has in their possession a device 22, here a card, such as a security card. The card 22 has at least the PuK-PrK and may include verification status data therein and can be used at a personal computer (pc) or the like 394. The pc 394 includes an I/O card reader 396 coupled thereto, a monitor 398, an alphanumeric keyboard 400, a mouse 402 and a microphone 404. The requesting entity 12 and the card 22 are associated with the medical account record 392 maintained by the medical records management company computer 14 in an account database 406. The party 12 has a 2ndAcctID stored in a field 408 and related medical information stored in a field 410. The medical information may be patient data for a specific procedure or specific test results related to a particular doctor or hospital, the medical history of the patient, the insurance and bill payment history, or the like.

To initiate a transaction, such as reviewing the insurance and bill payment history, the holder 12 inserts the card 22 into the card reader 396 of the pc 394. The pc 394 then allows the holder 12 to select a transaction using the keyboard 400 and/or the mouse 402 and the holder 12 selects a desired transaction with the record 392, such as reviewing the insurance and bill payment history. The holder 12 then uses the pc 394 to send the instruction and optionally a verification status input, such as the PIN or voice input to the microphone 404, to the card 22 where the verification status data, if any, is compared to the information entered and a verification status indicator is generated. The instruction, the AcctID and/or verification status indicator, then is digitally signed and returned with the AcctID as the EC 18 to the pc 394. The holder 12 then can send the EC 18 to the access authentication component 16, again using the keyboard 400 and/or the mouse 402 in a conventional manner. The access authentication component 16 uses the AcctID to obtain the PuK from the record 24 and authenticates the M and compares the verification status indicator, if present, with the verification status indicator table to authenticate access for the holder 12. With or without the verification status indicator, the access authentication component 16 can obtain the security profile of the card 22 from the record 300 in the database 298 and determine if the risk associated with card is acceptable for the requested transaction. If the card 22 is acceptable, then the account holder 12 is authenticated for access to the record 392. In the system 390, the access authentication component 16 also obtains the account permission, risk elements and other business rules from the record field 44. The permission is at least to access the account record 392 and obtain information regarding the account, such as the insurance and bill payment history stored in the field 410. The access authentication 16, if all requirements are satisfied, grants access to the management company computer 14, which in turn executes the instruction and obtains the payment history from the account record 392 and sends the results for display on the monitor 398 of the pc 394. The management company computer 14 can require a confirmation for each request in a session as before. The holder 12 also can initiate other request transactions in the same or separate in a similar manner.

As stated, the account based access system embodiment 50 only requires the requesting entity 12 to have possession of the PrK. The security profile based access system embodiment 290 requires the requesting entity 12 to have possession of the PrK and the device 292 with a desired security profile. The embodiment 160 requires that the requesting entity 12 have possession of the PrK and the device 162, have knowledge of some Secret, such as the PIN, and/or actually be something, such as a biometric characteristic of the requesting entity 12. The most secure access system would require a combination of all of the authentication factors, as now will be described with respect to FIG. 18.

Figure 18:
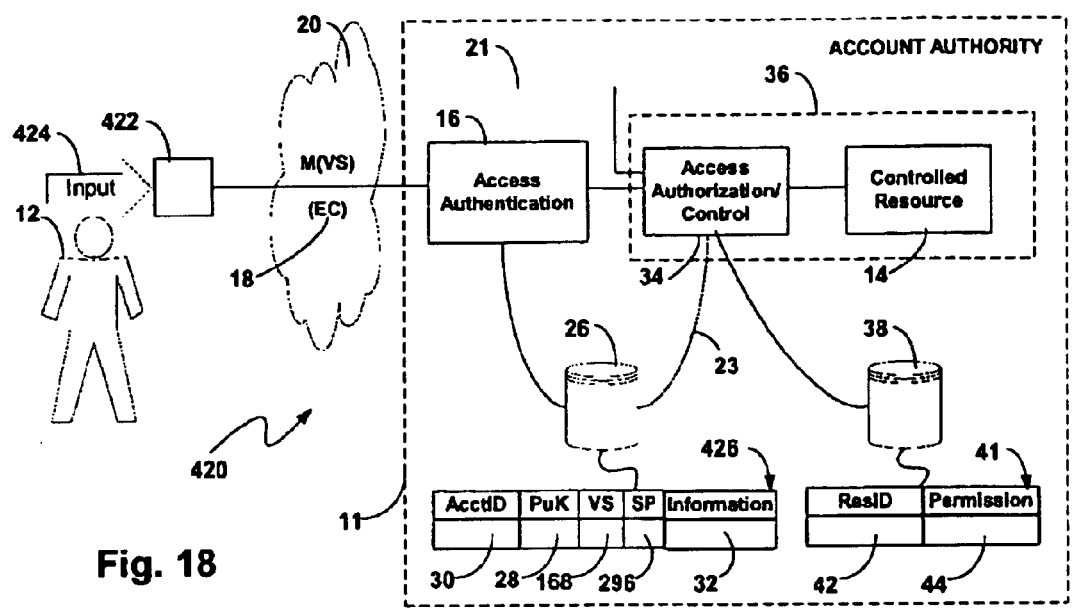
FIG. 18 illustrates a block diagram of a fourth embodiment of the present invention.

Referring now to FIG. 18, a fourth access authentication system embodiment of the present invention is designated generally by the reference numeral 420. The access system 420 includes the requesting entity 12 who desires access to the controlled resource 14. The account authority 11 can include all of the components of the system 420. The controlled resource 14 has the access to it authenticated by the access authentication component 16. The requesting entity 12 again sends an access request (AR) in the form of the EC 18 to the access authentication component 16 via the communication medium 20.

The EC 18 includes a message (M), such as just the AR. The M is digitally signed by the requesting entity 12 using the PrK of the PuK-PrK key pair, held by the requesting entity 12 in a secure device 422. The device 422 again contains the PuK-PrK key pair, can be used to digitally sign the M and preferably can export only the PuK. The device 422 additionally includes an input 424 from the requesting entity 12. The device 422 has verification data personal to the requesting entity 12 stored therein and a security profile 296 associated with the device 422. The verification data can be one or more types of biometric data and/or a Secret, such as security code/information, a PIN, or combinations thereof. The requesting entity 12 inputs the verification data into the device 422 and the device 422 attempts to match the verification data input with that stored in the device 422. The output of the comparison is a verification status indicator which can be, for example, no verification data input (00), a match with the stored verification data without another indicator having been output since the match (01), a failed match of the input verification data (10) or a match with the input verification data with another indicator having been output since the match (11). Details of embodiments of the device 422, including the verification data and verification status and the security profile 296 which can be utilized in the present invention, are described in detail in the VS and PRIMR applications incorporated by reference herein.

As in the previous embodiments, before the M can be sent to the access authentication component 16, the requesting entity 12 opens the security account with the account authority 11 and the access authentication component 16. The security account includes at least one record 425 related to the requesting entity 12. The security account and the record 426 preferably are established and maintained in the database 26 by the access authentication component 16, like the record 24. Details of embodiments of the database 26 and the operations thereof, which can be utilized in the present invention, are described in detail in the ABDS and VS applications incorporated by reference herein. The access authentication component 16 obtains the PuK of the requesting entity 12 and stores it in the record 426 in the PuK field 28. The access authentication component 16 associates the record 426 and therefore the PuK with a unique identifier or AcctID, stored in a field 30 in the record 426. The record 426 also includes an information field 32, which is associated with the security account of the requesting entity 12 and can include various information related to the requesting entity 12. The information can be the authentication factors for access and/or other information regarding the security account such as financial or records to be accessed by the requesting entity 12. In addition, the verification status optionally can be stored in the record 426 in the field 168 and the security profile is stored in the field 296, for example purposes.

As previously described, the controlled resource 14 generally will have its own access authorization/control 34. The access authorization/control 34 will receive the access authentication signal from the access authentication component 16 and will grant access to the requesting entity 12, directly or through the access authentication component 16. Access is granted, for example by accessing the database 38. The database 38 includes at least one record 41, including a ResID in the field 42 and the associated permission/rules in the field 44. The permission profile can be included with a set of business rules and risk elements for the particular application and can be the permitted level of access to the controlled resource 14 and/or other information regarding the account such as financial or business records to be accessed by the requesting entity 12. The controlled resource 14 or the access authorization/control 34 again can request confirmation of the authentication and any AR, such as via the links 21 and 23, as previously described. If the access authentication component 16 is also providing the access authorization/control to the controlled resource 14, in place of the access authorization/control 34, then the permission business rules and information will be located in the access authentication component 16, such as in the field 32 of the record 426, and it will directly grant access.

Figure 19:
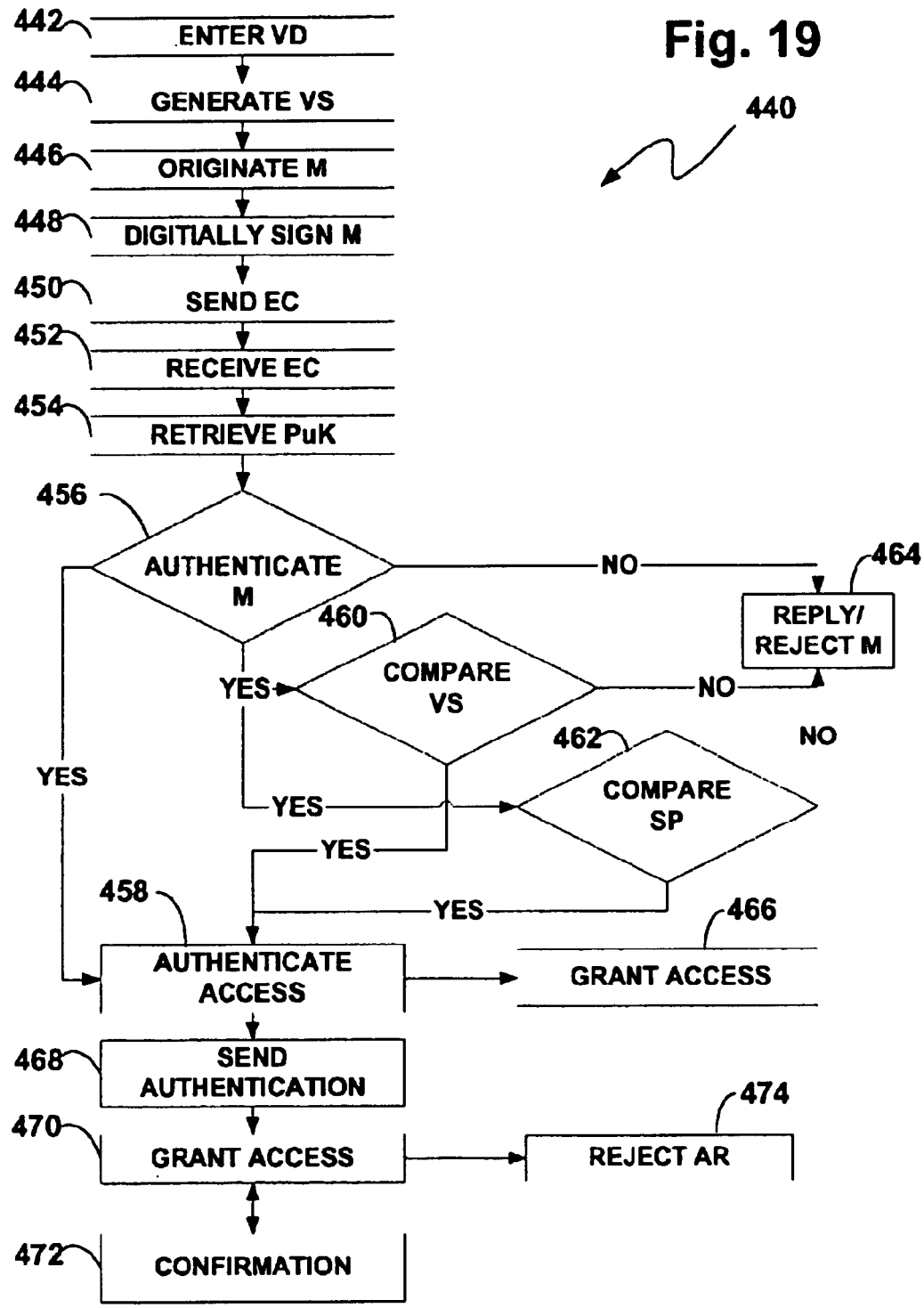
FIG. 19 illustrates a flow diagram of the operation of the fourth embodiment of the present invention.

Once the requesting entity 12 has initialized the security account with the account authority 11 and the access authentication component 16, then the requesting entity 12 can send an EC 18 to the access authentication component 16, to access the controlled resource 14, as described with respect to the flow diagram in FIG. 19.

Referring now to FIG. 19, a flow diagram 440 of the operation of the access system 420 is illustrated. The requesting entity 12 enters one or more types of verification data into the device input 424 in a step 442 and the device 422 generates one or more verification status indicators in a step 444. The requesting entity 12 then originates a M in a step 446, which can just be the verification status 168, the PuK or the AcctID, which acts then as an implicit AR to the access authentication component 16. The requesting entity 12 then digitally signs the M in a step 448. The PrK is utilized in the device 422, which is utilized by the requesting entity 12 to sign the M and then also to send the EC 18 in a step 450 over the medium 20 to the access authentication component 16. The access authentication component 16 receives the EC 18 in a step 452. The EC includes the AcctID 30, so that the access authentication component 16 then can retrieve the correct associated PuK 28 in the record 426 in a step 454. The access authentication component 16 then uses the PuK 28 to authenticate the M in a step 456.

The access system 420 includes the option of operating as each of the other embodiments or with combinations of some or all of the authentication factor embodiment features. First, if the access authentication component 16 can successfully authenticate the M, then the access authentication component 16 can authenticate access to the controlled resource 14 for the requesting entity 12 in a step 458, like the embodiment 50. The access authentication component also can attempt to authenticate the requesting entity 12 in a step 460, by comparing the verification status indicator with the stored verification status indicator table in the field 168 or in the access authentication 16. If the verification status is an acceptable match (01) the verification status authenticates and then the access authentication component 16 authenticates access to the controlled resource 14 for the requesting entity 12 in the step 458, like the embodiment 160. The verification status can include both the PIN and one or more biometric status matches and one or more of these, then would be authenticated in the step 460 to authenticate the requesting entity 12. The access authentication component 16 further can obtain and compare the security profile 296 in a step 462, to authenticate the AR. If the security profile of the card 422 is sufficiently reliable for the requested access request, then the request is authenticated and then the access authentication component 16 authenticates access to the controlled resource 14 for the requesting entity 12 in the step 458, like the embodiment 290. The access system 420 also can utilize combinations of the steps 456, 460 and 462, before authenticating access in the step 458. If the M does not authenticate in step 456, fails to match the verification status (VS) in step 460 or the card 422 fails to have a satisfactory security profile in step 462, then the access authentication component 16 rejects the AR and can send a rejection to the requesting entity 12 in a step 464. The controlled resource 14 can accept the access authentication signal directly from the step 458 to grant access in a step 466 to the requesting entity 12. Where the controlled resource 14 includes its own access authorization/control 34, then the access authentication signal is sent to the access authorization/control 34 in a step 468. As before, the access authorization/control 34 can be of many types and acts upon the authentication in a known conventional manner in accordance with the business rules established to grant access in a step 470 to the controlled resource 14. Again, the access authorization/control 34 and/or the controlled resource 14 can request a confirmation of the AR and/or one or more new/different authentication factor submissions as indicated by a step 472. If the confirmation or other rule is not satisfied, then the AR will be rejected in a step 474. A specific physical space application of the system 420 is illustrated with respect to FIG. 20.

Figure 20:
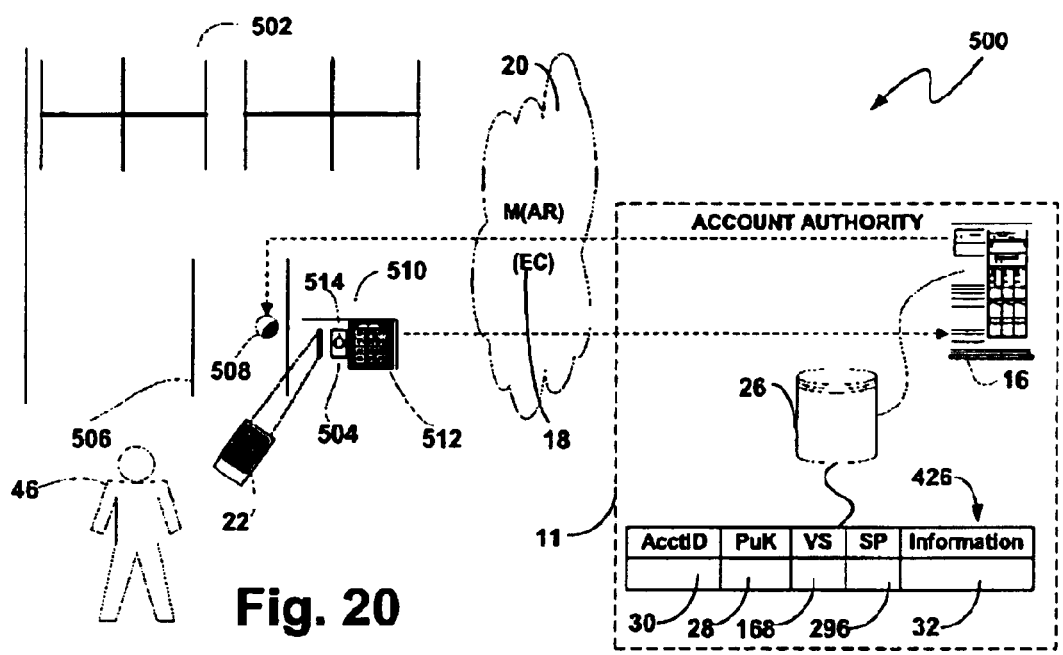
FIG. 20 illustrates a specific physical space application of the fourth embodiment of the present invention.

FIG. 20 illustrates a specific physical space application or system 500 of the fourth authentication factor embodiment 420 of the present invention. The account authority 11 can include all of the components of the system 500, generally without the space 502. In the system 500, the device 22 is in the form of an access card, such as a smart card, security card or ID badge, to access a physical space 502, illustrated as a secure building. In the system 500, the building 502 can be the controlled resource 14. The building 502 includes a plurality of rooms (not illustrated), one or more of which also could be the controlled resource 14, can be other controlled resources 14 or can just be accessible in the building 502, without further security authentication being required.

The card is configured to function in accordance with the fourth authentication factor embodiment 420 of the present invention. The card 22 includes a suitable computer chip (not illustrated), such as described in detail in the incorporated by reference VS applications. The structure of the card 22 again can be conventional and have the chip embedded therein, with structure for enabling communication with a card reader 504. The card 22 may include surface contacts (not illustrated) for enabling communication between the card 22 and the chip therein and the I/O reader 504 by physical contact. The card 22 may also be a proximity compliant card and/or a card 22 capable of both proximity and surface communication operations.

In the fourth authentication factor system 500, the card 22 requires the unique PuK-PrK key pair and one or more types of authentication factors, such as one or more types of verification status data inputs and/or the card 22 security profile. For the highest authentication factor facility/operation, such as a nuclear plant operating system, high security business/financial records, etc., the system can require combinations of all the authentication factors. The record 426 in the database 26 will have the AcctID, such as an employee ID number, of the requesting entity 12 in the field 30, the PuK in the field 28, information relating to the authentication factor of the party 12 in the field 32, one or more verification statuses in the field 168 and the security profile in the field 296. The authentication factor information 32 will include the level and type or types of data required for authenticating the requesting entity 16 for the building or facility 502. If the system 500 is only authenticating the requesting entity 12, then the record 426 may not include the permission and other rules in the field 32. If, the system 500 is both authenticating and authorizing access, as illustrated in FIG. 20, then the permission profile information/rules also will be included, for example, that the requesting entity 12 is authorized access to the building 502. The access can be restricted to certain hours, such as 8 AM to 7 PM, on certain days, such as Monday through Friday or other hours on weekends or can be unrestricted access twenty-four hours each day. If only authentication is provided by the system 500, then the permission information will be in the access authorization/control 34 (not illustrated in FIG. 20).

In operating the system 500, the requesting entity 12 presents the card 22 to the card reader 504 to gain access to the controlled resource 14, such as the building 502. The building 502 is secured by a locked door 506, which includes a lock 508, with the lock 508 being controlled/actuated by the access authentication component 16, providing both authentication and granting access in this example. The access authentication component 16 also is in communication with the card reader 504, such as through the Internet 20, a local network or physically hard wired as a part of the reader 504.

When the card 22 is presented to the reader 504, by insertion in the card reader 504 or by being brought into proximity with the reader 504, as the case may be, the reader 504 is initialized in a conventional manner. Initialization generally is accomplished by the reader 504 detecting the card 22 upon presentation, or by the card 22 outputting a reset signal/message to the reader 504. The card 22 can operate to output the reset signal as part of the start-up protocol of the card 22 in the system 500, when the card 22 receives power from the reader 504.

Following initialization, the reader 504 may display a message input request or prompt on a display 510. The prompt requests that a verification authentication factor is required and that the requesting entity 12 input the verification data, such as a PIN using an alphanumeric keypad 512 connected to or communicating with the reader 504 and to the card 22. The card 22 compares the PIN input with that stored therein and generates the verification status indicator for the PIN. A second, biometric input also can be required, such as a fingerprint input at a pad 514 on the reader 504, which also is sent and verified by the card 22. The card 22 then originates a M, which can be an implicit or default message established for the system 500, such as one or both of the verification status indicators. The card 22 digitally signs the message with the PrK to form the M, adds the AcctID to the M and exports the resulting EC 18 to the reader 504. The reader 504 communicates the EC 18 to the access authentication 16, where the AcctID with the M is used to find the record 426 in the database 26 and retrieve the PuK and any relevant security and permission information. The information may first be compared with the day and time that the card 22 is presented. If, the requesting entity 12 permission profile includes access at that day and time, the PuK then is utilized by the access authentication component 16 to authenticate the M. If the M authenticates to provide the verification status indicator (s), which can be compared to the verification status indicator table in the access authentication component 16 (illustrated as being in the field 168, for example purposes), then the requesting entity 12 is authenticated. If the other rules are satisfied, then the access authentication component 16 sends a grant access message to the door lock 508. The security profile 296 of the card 22 also can be retrieved by the access authentication component 16 and reviewed for a suitable level of reliability for the requested access, before or after the verification status indicator(s). Alternately, the M can be first authenticated and then the access information can be compared after the M is successfully authenticated. The lock 508 then is actuated to unlock the door 506 granting access to the requesting entity 12 to the building 502.

The system 500 operates as desired upon what the requesting entity 12 possesses (factor A), here the card 22, what the requesting entity 12 knows (factor B), here the PIN, what the security reliability of the card 22 is and what the requesting entity 12 is (factor C), here the fingerprint. As long as the card 22 has the correct AcctID, PrK and the correct PIN is input by the requesting entity 12, the security profile of the card 22 is reliable, and the other rules are satisfied, then access can be granted, whether or not the requesting entity 12 is the party who is the rightful possessor of the card 22. Adding the fingerprint ensures that the requesting entity 12 is whom they are supposed to be and provides the highest authentication factor. If one of the required authentication factor fails, such as if the AcctID does not match an AcctID in the database 26, if the M does not authenticate of if the PIN is incorrect or not entered, or the other rules or risk elements are not satisfied, then the access authentication component 16 will send a rejection to the card 22 or alternately will just not open the door 506. An internal or external security alarm could also be generated to be used by the system 500, as desired.

Figure 21:
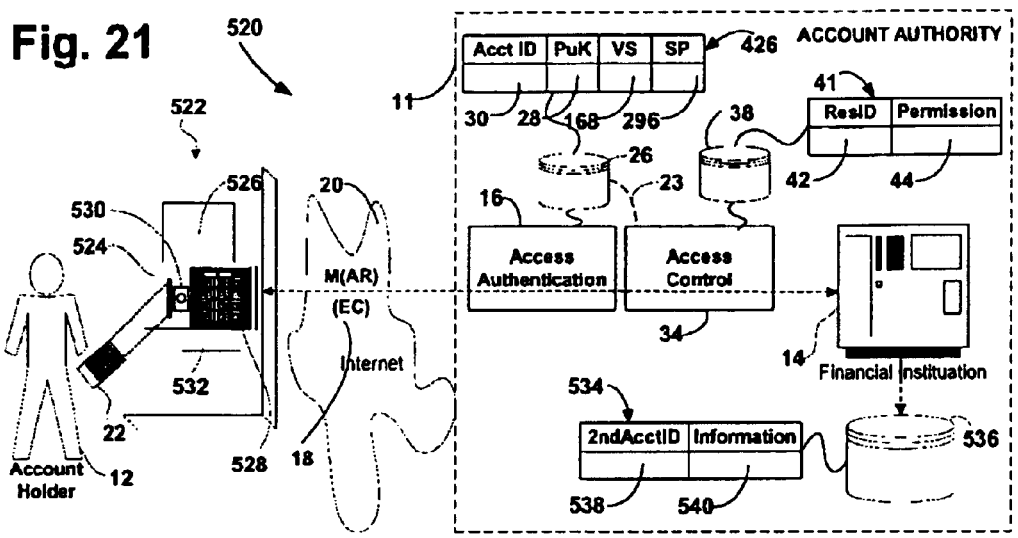
FIG. 21 illustrates a specific financial application of the fourth embodiment of the present invention.

FIG. 21 illustrates a specific financial application or system 520 of the fourth multiple authentication factor embodiment 420 of the present invention. Functions which are the same or substantially the same as the system 500 are not repeated in detail, since they would be understood by one skilled in the art. The requesting entity 12 is an account holder in the controlled resource 14, here a financial institution computer. The account holder 12 has in their possession a device 22, here a card, such as an ATM card. The card 22 has the one or more types of verification data and the PuK-PrK therein, has a related security profile 296 and can be used at an ATM machine or the like 522. The machine 522 includes a card reader 524, a display 526, an alphanumeric keypad 528, a biometric input, such as a fingerprint pad 530 and a cash dispenser 532. The account authority 11 can include all of the components of the system 420, with or without the machine 522. The requesting entity 12 and the card 22 are associated with an account record 534 maintained by the financial institution computer 14 in an account database 536. The party 12 has a 2ndAcctID stored in a field 538 and related account information stored in a field 540. The account may be a checking account, savings account, money market or the like. The financial institution may be a bank, a credit union, an Internet bank or the like.

To initiate a transaction, the holder 12 inserts the card 22 into the card reader 524 of the machine 522. The machine 522 is initialized by the insertion of the card 22 and prompts the holder 12 to select a transaction using the display 526 and the holder 12 selects a displayed transaction using the keyboard 528, such as a cash withdrawal. The authentication factor(s) to be entered can be decided by business rules related to the amount to be requested or to the type of the account. As an example, just possession of the PrK could be required for withdrawals of less than $100; the PrK and a Secret, such as a PIN for withdrawals of less than $500; the PrK, the PIN and a certain security profile for withdrawals of less than $1000 and the PrK, the PIN, the required security profile and at least one biometric input for withdrawals of more than $1000. The holder 12 enters a withdrawal request for $400 and enters the required information, here the PIN using the keyboard 528. The machine 522 then sends the cash withdrawal instruction to the card 22, where the invention is digitally signed and returned with the AcctID and the PIN verification status indicator as the EC 18 to the machine 522, which sends the EC 18 to the access authentication 16. The access authentication component 16 uses the AcctID to obtain the PuK from the record 24 and authenticates the M and compares the verification status to the stored table of verification status indicators to authenticate access for the holder 12. The access authentication signal then is sent to the access authorization/control 34, which uses the ResID to obtain the account permission profile and other rules from the record 41. The permission is to access the account and withdraw cash up to $500 and generally to obtain information regarding the account, such as the resulting account balance. Since the requested amount of $400 is less than the authorized limit of $500, the access authorization/control 34, presuming the other rules are satisfied, grants access to the financial institution computer 14. The financial institution computer 14 executes the instruction, compares the balance available from the account record 534 and if sufficient sends an instruction to the machine 522 to dispense the requested $400 cash and to display the balance on the display 526 of the machine 522. The access authorization/control 34 and/or the institution computer 14 can request a confirmation through the access authentication component 16 of the requested transaction and can access the database record 426 during a session or can request entry of a higher authentication factor. The holder 12 can initiate other transactions in the same or different sessions in a similar manner.

Figure 22:
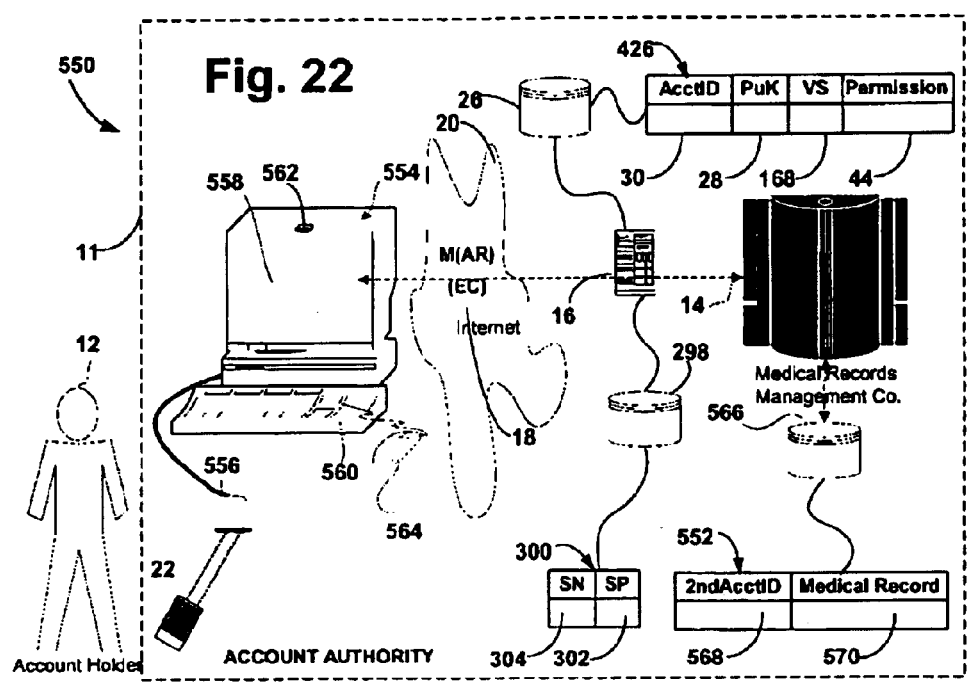
FIG. 22 illustrates a specific information application of the fourth embodiment of the present invention.

FIG. 22 illustrates a specific medical business record application or system 550 of the fourth multiple authentication factor embodiment 420 of the present invention. Again, functions which are the same or substantially the same as the system 500 are not repeated in detail, since they would be understood by one skilled in the art. The account authority 11 can include all of the components of the system 550. The requesting entity 12 is an account holder of a medical record 552 in the controlled resource 14, here a medical records management company computer. The account holder 12 has in their possession a device 22, here a card, such as a security card. The card 22 has the PuK-PrK, an associated security profile and preferably a plurality of verification status data entries therein and can be used at a personal computer (pc) or the like 554. The pc 554 includes a card reader 556 coupled thereto, a monitor 558, an alphanumeric keyboard 560, a microphone 562 and a mouse 564. The requesting entity 12 and the card 22 are associated with the medical account record 552 maintained by the medical records management company computer 14 in an account database 566. The requesting entity 12 has a 2ndAcctID stored in a field 568 and related medical information stored in a field 570. The medical information may be patient data for a specific procedure or specific test results related to a particular doctor or hospital, the medical history of the patient, or the like.

To initiate a transaction, such as reviewing the medical history, the holder 12, which could be the patient's doctor or medical staff authorized to read or change the information 570, inserts the card 22 into the card reader 556 of the pc 554. The pc 554 then allows the holder 12 to select a transaction using the keyboard 560 and/or the mouse 564 and the holder 12 selects a desired transaction with the record 552, such as updating the medical history. The holder 12 then uses the pc 554 to send the instruction to the card 22 with the required authentication factors. Further, since in this case the holder 12 is not the patient associated with the record 552, the computer 14 may require other actions be taken before the record 552 can be accessed. For changing the information, a high authentication factor will be required. For example, this can be the PuK, a PIN or knowledge of other security information and a biometric input, here a voice input to the microphone 562. The holder 12 will input the instruction and/or request with the keyboard and/or the mouse 564, the PIN with the keyboard 560 and enter a voice input to the microphone 562. The pc 554 will forward the inputs to the card 22, where the verification status data is compared to the PIN and to the voice print entered and the verification status indicators are generated. The instruction to access and update the history, then is digitally signed and returned with the AcctID as the EC 18 to the pc 554. The holder 12 then can send the EC 18 to the access authentication component 16, again using the keyboard 560 and/or the mouse 564 in a conventional manner. The access authentication component 16 uses the AcctID to obtain the PuK from the record 426 and authenticates the M and compares the verification status indicators with the verification status indicator table to authenticate access for the holder 12. In the system 550, the access authentication component 16 obtains the account permission profile from the record field 44. The permission in this case is to both access and update or modify the account record 552 and obtain the updated and other information regarding the account, such as the medical history stored in the field 570. The access authentication component 16 grants access to the management company computer 14, which in turn executes the instruction and obtains and/or modifies the medical history from the account record 552 and sends the resulting information for display on the monitor 558 of the pc 554. The management company computer 14 can require a confirmation for each request in a session as before. For changing/updating the information, the rules would require the confirmation and possibly reentry of the biometric data for a strong confirmation of the requested change. The holder 12 also can initiate other request transactions in the same or separate sessions with the same or different authentication factor requirements in a similar manner.

Figure 23:
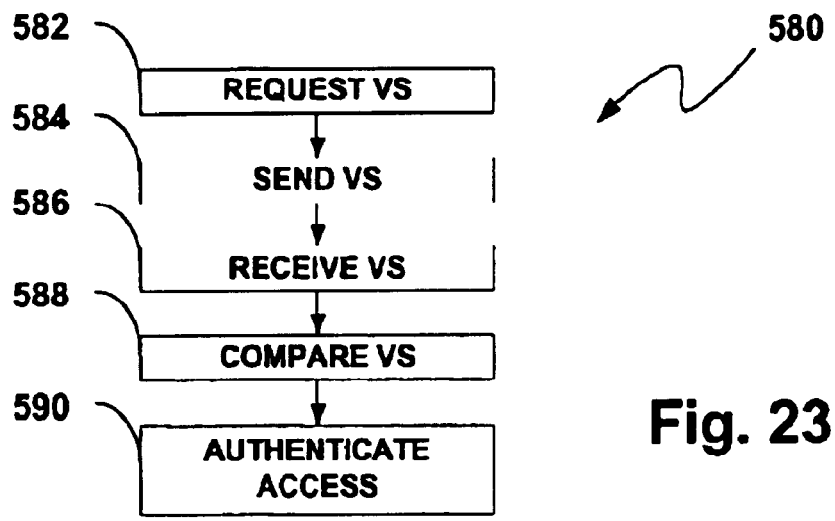
FIG. 23 illustrates a flow diagram of the operation of another verification status based embodiment of the present invention.

Although the verification status based embodiments 160, 220, 240 and 270 described with respect to FIGS. 8–12, were described as utilizing a digital signature, the verification status based techniques can also be utilized as a portion of/or precursor for the authentication and/or authorization for access to the controlled resources 14 of the present invention. One use of the verification status based techniques is illustrated in a flow diagram 580 in FIG. 23. In the embodiment of FIG. 23, referring generally to the embodiment 160 in FIG. 8, the requesting entity 12 has already presented the device 162 and has presented a valid verification status and satisfied the permission profile and rules for the access request previously authenticated. The session with the controlled resource 14 has either continued for an extended time period and the authentication has expired or another transaction has been requested, which requires reentry or reconfirmation of the present verification status. The time period lapse and the reentry requirement are examples of the business rules established for the system 160. The access authentication component 16 maintains the rules and now requests a verification status from the device 162 in a step 582. The device 162 sends the current verification status indicator to the access authentication component 16 in a step 584. The access authentication component 16 receives the verification status indicator in a step 586 and compares the received verification status with the table of verification status indicators and the rules for the continuing/requested transaction in a step 588. In the current verification status is sufficient, then the transaction is allowed to proceed and the access is authenticated in a step 590. In the case where the current verification status presented is not sufficient or the card 162 is being first presented for a transaction, then the access authentication component 16 will request a new verification status data entry by the requesting entity 12, as illustrated in FIG. 24.

Figure 24:
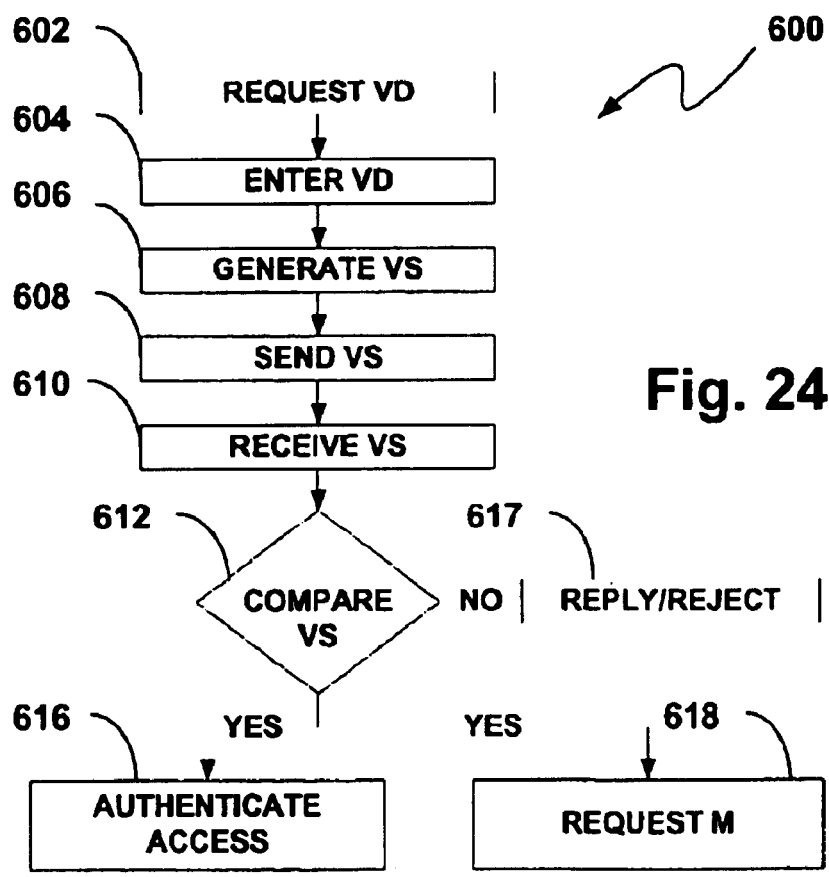
FIG. 24 illustrates a flow diagram of the operation of a further verification status based embodiment of the present invention.

A flow diagram 600 in FIG. 24, illustrates the further or precursor entry of verification status data by the requesting entity 12. The diagram 600 illustrates the verification status data entry required, for example purposes, by the insufficient verification status presented in FIG. 21, a request for a transaction requiring a new or different verification status or when first presenting the device 162 for a transaction or session. The access authentication component 16 can request entry of a particular verification status type of data, such as a PIN or biometric entry in a step 602. The requesting entity 12 then enters the requested verification status data into the card 162 in a step 604. The requesting entity 12 also may automatically enter the verification status data required for a particular transaction when the card 162 is presented to the system 160. In any case, only the verification status data is entered, then the card 162 generates a verification status in a step 606. The verification status indicator then is sent to the access authentication component 16 in a step 608 and received in a step 610. The verification status then is compared in a step 612. If the verification status is not acceptable, then it is rejected in a step 614 and the requesting entity 12 will be notified and typically may reenter the verification status data one or more times (not illustrated). If the verification status is acceptable, then the access authentication component 16 can authenticate the continued access in a step 616. Where the device 162 is first being presented for a transaction, then the access authentication component 16 will request a M from the requesting entity 12 in a step 618. The authentication and authorization process then can commence at step 186 in FIG. 9 to complete the authentication and access granting steps as before. The process can use the verification status generated in the step 606 or may require reentry of the same or different verification status data. Thus the verification status can be used without or in combination with the digital signature, as desired.

In a similar manner, although the security profile based embodiments 290, 340, 360 and 390 described with respect to FIGS. 13–17, were described as utilizing a digital signature, the security profile based techniques can also be utilized as a portion of/or precursor for the authentication and/or authorization for access to the controlled resources 14 of the present invention. One use of the security profile based techniques is illustrated in a flow diagram 630 in FIG.

Figure 25:
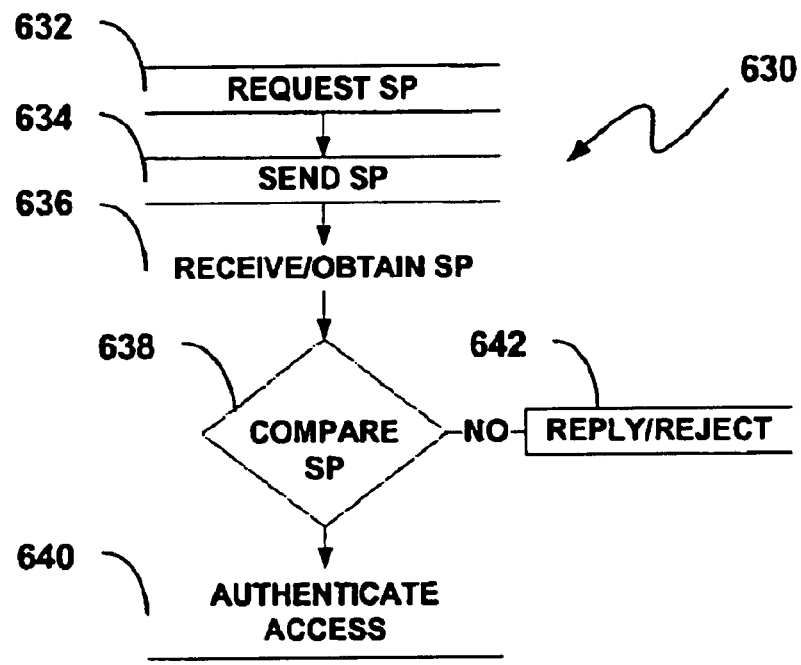
FIG. 25 illustrates a flow diagram of the operation of another security profile based embodiment of the present invention.

25. In the embodiment of FIG. 25, referring generally to the embodiment 290 in FIG. 13, the requesting entity 12 has already presented the device 292 which has a valid security profile for the access request previously authenticated. The session with the controlled resource 14 has either continued for an extended time period and the authentication has expired or another transaction has been requested, which requires reentry or reconfirmation of the security profile. The time period lapse and the reconfirmation requirement are examples of the business rules established for the system 290. The access authentication component 16 maintains the rules and now requests a security profile from the device 292 in a step 632. The device 292, in the configuration that can send the security profile, sends the security profile to the access authentication component 16 in a step 634. The access authentication component 16 receives the security profile in a step 636, or in the case where it is separately stored in one of the databases 26 or 298, the access authentication component 16 obtains the security profile therefrom. The access authentication component 16 then compares the received/obtained security profile with the risk element characteristics of the security profile required by the rules for the continuing/requested transaction in a step 638. If the security profile is sufficient, then the transaction is allowed to proceed and the access is authenticated in a step 640. In the case where the security profile is not sufficient, then the access authentication component 16 will reject the AR in a step 642.

Figure 26:
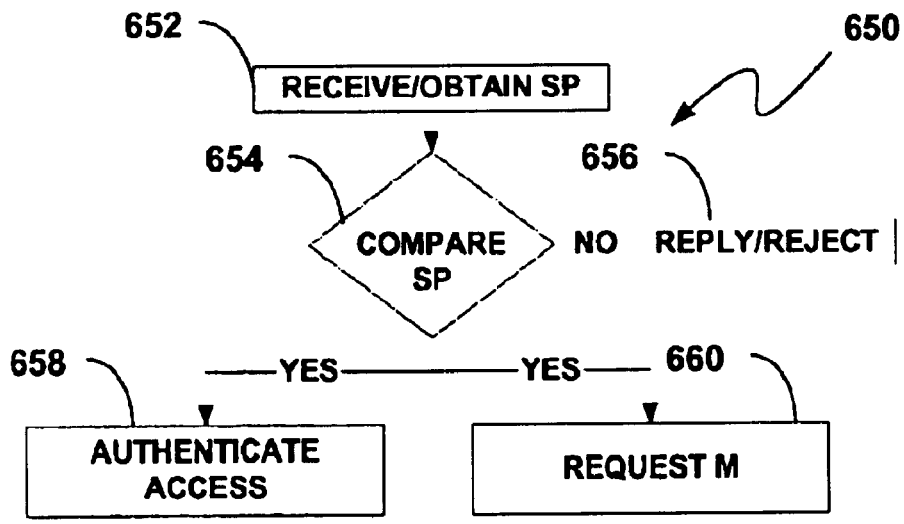
FIG. 26 illustrates a flow diagram of the operation of a further security profile based embodiment of the present invention.

A flow diagram 650 in FIG. 26, illustrates a precursor use of the security profile by the access authentication 16. The diagram 650 illustrates the security profile use required, for example purposes, when first presenting the device 162 for a transaction. The access authentication component 16 will receive or obtain the security profile in a step 652 when the card 162 is presented to the system 160. In any case, the access authentication component 16 then compares the received/obtained security profile with the characteristics of the security profile required by the rules for the requested transaction in a step 654. If the security profile is not acceptable, then it is rejected in a step 656 and the requesting entity 12 may be notified. If the security profile is acceptable, then the access authentication component 16 can authenticate the requested access in a step 658. Where the device 162 is first being presented for a transaction, then the access authentication component 16 can request a M from the requesting entity 12 in a step 660. The authentication and authorization process then can commence at step 312 in FIG. 14 to complete the authentication and access grant steps as before. The process then can use the security profile comparison already determined in the step 654 or may repeat the comparison in the step 324. Thus the security profile also can be used without the digital signature, where desired.

One potential problem is using the embodiments of the present invention is they may be subject to a replay attack. In a replay attack, an unauthorized party intercepts the M being recorded and the digital signature and then repeatedly retransmits the copied transmission to the access authentication component 16 in an attempt to gain access to the controlled resource 14. Without proper safeguards, such a replay attack can be successful, since the original digital signature and a copy of the digital signature both can authenticate with the PuK.

To preclude such replay attacks, the systems of the present invention can include something unique with what is digitally signed. One method is to use the DSS standard, which ensures that each digital signature M is unique. A second method is to send a unique confirmation or other message from the access authentication component 16 to the card 22 for each digital signature. In this case, the return AR digital signature with the unique confirmation from the card 22 is presumed to be valid, while any further AR with the same digital signature, including the same unique confirmation as used before is presumed to be fraudulent. The unique message from the access authentication component 16 or from a card reader in one of the embodiments of the present invention, can be a date/time stamp with an incrementing sequence number. A further technique is to generate a random number in the device 22 for each separate digital signature. This requires that the access authentication component 16 maintain the previously used random numbers, at least for some time period, to ensure that they are not used again. Thus no two valid AR digital signatures would ever be the same, minimizing replay attacks.

As described with respect to the embodiments of the present invention, a dual purpose message is described. The AR is used to both authenticate the requesting entity as well as to authenticate the instruction or action, contained implicitly or explicitly in the AR. In the described operations, the access authentication component maintains an AcctID and/or a PuK in an account associated with the requesting entity. Account information, a permission profile and business rules associated with granting access and acting on the instruction are also maintained by the authentication party, by the accessed resource or in the access authorization/control or in combinations thereof. It specifically is contemplated within the present invention, that existing account based systems, which currently associate account identifiers and account information, can be adapted (retrofitted) in accordance with the present invention. This may be accomplished by associating the PuK, as used herein, in the database with the preexisting account identifier and account information. By doing so, the prior art systems can eliminate separate logon procedures followed by separate instructions and thereby simplify the access transactions to the single AR as described herein. Utilized with the PuK and digital signature and the authentication factors of the present invention, the authentication and instructions of the prior art systems can be both simplified and the authentication is also made stronger, reducing the risk associated with the use of the prior art systems.

Those persons skilled in the art will understand and appreciate that the sequence (s) and/or temporal order of the steps of the flow diagrams or processes described and claimed herein, are those considered to be the best mode for carrying out the present invention. It also should be understood that, although steps of various embodiments are shown and described in a particular sequence or temporal order, the steps are not limited to being carried out in any particular sequence or order, absent a specific indication that a step or steps should be carried out in a particular sequence or order to achieve a particular intended result. In most instances, the steps may be carried out in various different sequences and orders, while still falling within the scope of the present inventions.

What is claimed is:

1. A system for authenticating a requesting entity for access to a controlled resource, comprising:
   (a) a device possessed by the requesting entity, the device maintaining securely therein pre-stored verification data of the requesting entity, the device configured to generate, upon receipt of suspect verification data input into the device, a verification status indicator based on a comparison of the suspect verification data with the pre-stored verification data of the requesting entity, the device also maintaining securely therein a private key of a public-private key pair and adapted to generate a digital signature of a message using the private key, the digitally-signed message comprising:
  (i) a unique identifier,
  (ii) a request by the requesting entity for access to the controlled resource, and
  (iii) the verification status indicator generated by the device;
(b) an access authentication component having authority to allow or deny the request for access to the controlled resource, the access authentication component separate from the device but in electronic communication over a communications medium with the device for receipt of the digitally-signed message; and
(c) a database accessible by the access authentication component, the database containing predetermined authorization rights of the requesting entity and the public key of the public-private key pair but not containing the private key or the verification data of the requesting entity, wherein the unique identifier is associated with the public key in the database prior to receipt of the digitally-signed message and wherein the public key is accessible from the database based on the unique identifier;
wherein, in response to receipt of the digitally-signed message, the access authentication component verifies that the message was digitally-signed using the private key maintained within the device by decrypting the digital signature using the public key obtained from the database, and if the digitally-signed message verifies, the access authentication component authenticates the requesting entity for access to the controlled resource as a function of (i) the verification status indicator obtained from the digitally-signed message and (ii) the predetermined authorization rights of the requesting entity.

2. The system of claim 1 wherein the message is originated by the device.

3. The system of claim 1 wherein the message is input into the device by a message generating component.

4. The system of claim 1 wherein the message and digital signature of the message are communicated by the device to the authentication component.

5. The system of claim 1 wherein the message and digital signature of the message are communicated from the device to the access authentication component by an electronic communication component.

6. The system of claim 1 wherein the request for access is inferred from the message.

7. The system of claim 1 wherein the request for access is explicitly stated as part of the message.

8. The system of claim 1 wherein the verification status indicator indicates that no suspect verification data has been input into the device within a predetermined period of time.

9. The system of claim 1 wherein the verification status indicator indicates that there was a successful comparison of the suspect verification data with the verification data of the requesting entity previously stored in the device.

10. The system of claim 1 wherein the verification status indicator indicates that said indicator was included in a previously digitally-signed message generated by the device.

11. The system of claim 1 wherein the verification status indicator indicates that there was an unsuccessful comparison of the suspect verification data with the verification data of the requesting entity previously stored in the device.

12. The system of claim 1 wherein the verification status indicator indicates the degree of comparison of the suspect verification data with the verification data of the requesting entity previously stored in the device.

13. The system of claim 1 wherein the suspect verification data is input into the device by the requesting entity.

14. The system of claim 1 wherein the verification data is a secret, PIN, or password.

15. The system of claim 1 wherein the verification data is biometric data of the requesting entity.

16. The system of claim 1 wherein the verification data of the requesting entity is not determinable from the verification status indicator.

17. The system of claim 1 wherein the type of suspect verification data input into the device is determinable from the verification status indicator.

18. A system for providing a requesting entity with access to a controlled resource, comprising:
  (a) a device possessed by the requesting entity, the device maintaining securely therein pre-stored verification data of the requesting entity, the device configured to generate a verification status indicator based on a comparison of the suspect verification data input into the device with the pre-stored verification data of the requesting entity, the device also maintaining securely therein a private key of a public-private key pair and adapted to generate digital signatures of a message using the private key, the digitally-signed message comprising:
    (i) a unique identifier,
    (ii) a request by the requesting entity for access to the controlled resource, and
    (iii) the verification status indicator generated by the device;
  (b) an access authentication component having authority to allow or deny the request for access to the controlled resource, the access authentication component maintaining in a database a security account of the requesting entity, the security account including information accessible by the access authentication component based on the unique identifier, the information including the public key of the public-private key pair and predetermined authorization of the requesting entity to access the controlled resource; and
  (c) a transmitter component in electronic communication of a communication medium with the device and with the access authentication component, the transmitter component configured to transmit the digitally-signed message from the device to the access authentication component;
wherein, in response to receipt of the digitally-signed message, the access authentication component verifies that the message was digitally-signed using the private key by decrypting the digital signature using the public key obtained from the database, such verification not requiring a digital certificate and, upon successful verification of the message, the access authentication component grants the requesting entity with access to the controlled resource as a function of the verification status indicator obtained from the digitally-signed message and the predetermined authorization of the requesting entity.

19. The system of claim 18 wherein the transmitter component provides the message to the device.

20. The system of claim 18 wherein the access authentication component does not reside in and is not part of the device.

21. The system of claim 18 wherein the requesting entity is required to input further suspect verification data into the device to generate a new verification status indicator required before the requesting entity is granted access to the controlled resource.

22. The system of claim 18 wherein the requesting entity already has access to the controlled resources and wherein the requesting entity is required to input further suspect verification data into the device to generate a new verification status indicator required for the requesting entity to have continued access to the controlled resource.

23. The system of claim 18 wherein the controlled resource is a computer system.

24. The system of claim 18 wherein the controlled resource is a physical space.

25. The system of claim 18 wherein the controlled resource is a data record.

26. The system of claim 18 wherein the suspect verification data is input into the device by the requesting entity.

27. A system for authenticating a requesting entity for access to a controlled resource, wherein, prior to a request for access to the controlled resource, the requesting entity is provided with a secure device, verification data of the requesting entity is input into and stored securely within the secure device, a private key of a public-private key pair is stored securely within the secure device, the public key of the public-private key is stored in a database of an access authentication component having authority to allow or deny the request for access to the controlled resource, a unique identifier is associated with the public key such that the public key is retrievable from the database by the access authentication component based on the unique identifier, and authorization rights of the requesting entity to access the controlled resource are assigned to the requesting entity, the system further comprising:
  (a) the secure device which receives suspect verification data, generates a verification status indicator based on a comparison of the suspect verification data with the pre-stored verification data of the requesting entity, and digitally signs a message that includes:
    (i) the unique identifier,
    (ii) the request by the requesting entity for access to the controlled resource, and
    (iii) the verification status indicator;
  (b) a data transmission component in electronic communication with the secure device and in electronic communication over a communications medium with the access authentication component, the data transmission component receives the digital signature of the message from the device and transmits the message and digital signature of the message to the access authentication component;
  (c) upon receipt of the message and digital signature of the message, the access authentication component retrieves the public key from the database based on the unique identifier obtained from the message and verifies that the message was digitally-signed using the private key maintained within the device by decrypting the digital signature with the public key; and
  (d) upon successful verification of the message and without need of a digital certificate to attest to the validity of the private key or to attest to the integrity of the secure device, the access authentication component grants the requesting entity with access to the controlled resource solely as a function of the verification status indicator obtained from the digitally-signed message and the pre-assigned authorization rights of the requesting entity.

28. A system for authenticating a requesting entity for continued access to a controlled resource, wherein the requesting entity already has been granted access to and is currently accessing the controlled resource, wherein an access authentication component has authority to allow or deny the continued access to the controlled resource, wherein the access authentication component has access to a database in which, prior to an original grant of access to the controlled resource for the requesting entity, a unique identifier has been associated with a public key of a public-private key pair and wherein the public key is accessible from the database based on the unique identifier, comprising:
  (a) the access authentication component maintains business rules regarding continued access to the controlled resource, and wherein the access authentication component sends a confirmation request to the requesting entity in accordance with the business rules;
  (b) a device possessed by the requesting entity and maintaining securely therein pre-stored verification data of the requesting entity, the device configured to generate a verification status indicator based on a comparison of suspect verification data input into the device with the pre-stored verification data of the requesting entity, the device also maintaining securely therein the private key of the public-private key pair and adapted to generate digital signatures using the private key, wherein, in response to the confirmation request, the requesting entity inputs suspect verification data into the device and wherein, in response to the input of suspect verification data, the device (i) generates the verification status indicator, (ii) includes the verification status indicator in a message, and (iii) digitally-signs the message using the private key; and wherein the digitally-signed message is provided to the access authentication component;
  (c) in response to receipt of the digitally-signed message, the access authentication component verifies that the message was digitally-signed using the private key maintained within the device by decrypting the digital signature using the public key obtained from the database; and
  (d) if the digitally-signed message verifies, the access authentication component authenticates the requesting entity for continued access to the controlled resource as a function of the verification status indicator obtained from the digitally-signed message.

29. The system of claim 28 wherein the message includes the confirmation request.

30. The system of claim 29 wherein the confirmation request is provided to the device by an electronic communication component.

31. The system of claim 28 wherein the access authentication component does not reside in and is not part of the device.

32. The system of claim 28 wherein the digitally-signed message is communicated by the device to the authentication component.

33. The system of claim 28 wherein the digitally-signed message is communicated from the device to the access authentication component by an electronic communication component.

34. The system of claim 28 wherein the verification status indicator indicates that no suspect verification data has been input into the device within a predetermined period of time.

35. The system of claim 28 wherein the verification status indicator indicates that there was a successful comparison of the suspect verification data with the verification data of the requesting entity previously stored in the device.

36. The system of claim 28 wherein the verification status indicator indicates that said indicator was included in a previous digitally-signed message generated by the device.

37. The system of claim 28 wherein the verification status indicator indicates that there was an unsuccessful comparison of the suspect verification data with the verification data of the requesting entity previously stored in the device.

38. The system of claim 28 wherein the verification status indicator indicates the degree of comparison of the suspect verification data with the verification data of the requesting entity previously stored in the device.

39. The system of claim 28 wherein the verification data is a secret, PIN, or password.

40. The system of claim 28 wherein the verification data is biometric data of the requesting entity.

* * * * *